United States Patent
Ueno et al.

(10) Patent No.: US 7,503,684 B2
(45) Date of Patent: Mar. 17, 2009

(54) PLANAR LIGHT SOURCE AND IMAGE DISPLAY

(75) Inventors: Yoshihiro Ueno, Kusatsu (JP); Masayuki Shinohara, Nagaokakyo (JP)

(73) Assignee: OMRON Corporation, Kyoto (JP)

(*) Notice: Subject to any disclaimer, the term of this patent is extended or adjusted under 35 U.S.C. 154(b) by 17 days.

(21) Appl. No.: 10/560,208

(22) PCT Filed: Jun. 11, 2004

(86) PCT No.: PCT/JP2004/008200

§ 371 (c)(1),
(2), (4) Date: Mar. 21, 2006

(87) PCT Pub. No.: WO2004/111531

PCT Pub. Date: Dec. 23, 2004

(65) Prior Publication Data

US 2006/0181897 A1    Aug. 17, 2006

(30) Foreign Application Priority Data

Jun. 12, 2003 (JP) ............................. 2003-168344

(51) Int. Cl.
*F21V 7/04* (2006.01)
(52) U.S. Cl. ..................... 362/620; 362/600
(58) Field of Classification Search ................ 362/600, 362/607, 610, 623
See application file for complete search history.

(56) References Cited

U.S. PATENT DOCUMENTS 7,073,933 B2 * 7/2006 Gotoh et al. ............... 362/624
7,220,038 B2 * 5/2007 Yamashita et al. ......... 362/606
7,322,731 B2 * 1/2008 Epstein et al. ............. 362/609

FOREIGN PATENT DOCUMENTS

JP    7-294745    11/1995

(Continued)

OTHER PUBLICATIONS

International Search Report PCT/JP2004/008200 dated Aug. 31, 2004 (2 pages).
Patent Abstracts of Japan 2000-133906 dated May 12, 2000 (6 pages) (cited in Specification).

(Continued)

*Primary Examiner*—Anabel M Ton
(74) *Attorney, Agent, or Firm*—Osha • Liang LLP

(57) ABSTRACT

A plane source of light (back light) of the type of emitting light from both surfaces featuring a good light utilization efficiency and without permitting the external light to transmit through a display device even when it is combined with display panels of the transmission type. Light is introduced from a point source of light into a light guide plate. Many deflecting patterns of a triangular shape in cross section are formed in a recessed manner in a surface (pattern surface) on the side opposite to a light-leaving surface of the light guide plate. A prism sheet forming a plurality of arcuate prisms is arranged on a position facing the pattern surface of the light guide plate. Light propagating through the light guide plate is totally reflected by the deflecting pattern and goes out from the light-leaving surface nearly perpendicularly thereto. Light propagating through the light guide plate transmits through the deflecting patterns, goes out aslant, and is bent by the prisms into a direction nearly perpendicular to the pattern surface as it transmits through the prism sheet.

8 Claims, 30 Drawing Sheets

FOREIGN PATENT DOCUMENTS

| | | |
|---|---|---|
| JP | 10-241431 | 9/1998 |
| JP | 2003-35825 | 2/2003 |
| JP | 2004-70189 | 3/2004 |
| JP | 2004-111353 | 4/2004 |

OTHER PUBLICATIONS

Japanese Office Action for Japanese patent application No. 2005-506932, mailed Dec. 4, 2007, and English translation thereof, 6 pages.

* cited by examiner

FIGURE 12 (a)
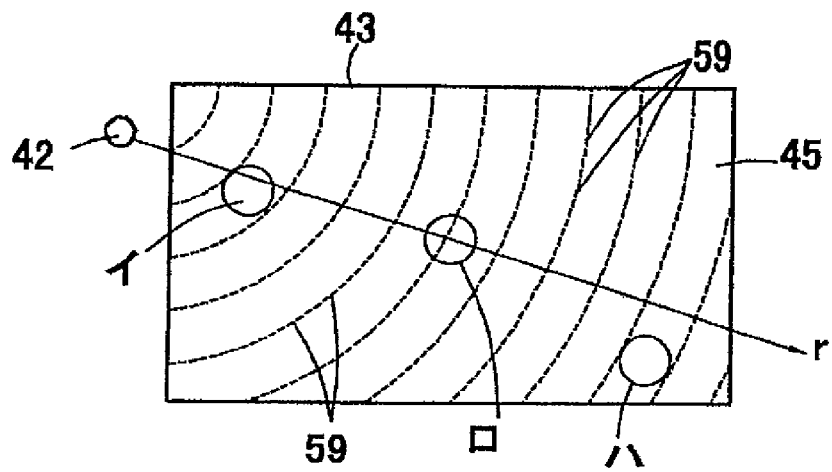
FIGURE 12 (b)
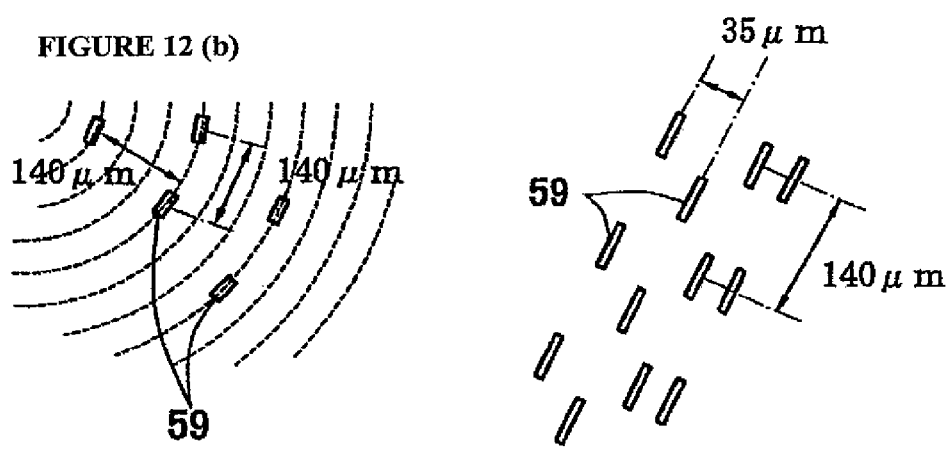
FIGURE 12 (d)
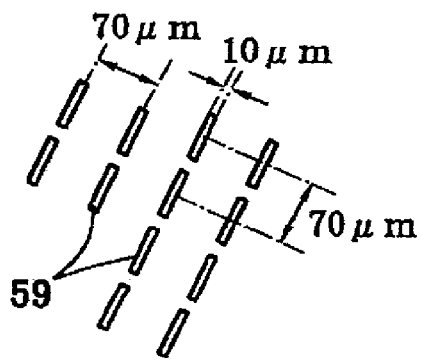
FIGURE 12 (c)

DISTANCE r FROM THE SOURCE OF LIGHT

FLOW OF RESIN

FLOW OF RESIN

SIDE OF THE
SOURCE OF LIGHT

PLANAR LIGHT SOURCE AND IMAGE DISPLAY

FIELD OF THE INVENTION

This invention relates to a plane source of light of the type of emitting light from both surfaces and to an image display device.

BACKGROUND OF THE INVENTION

FIG. 1 is a view schematically illustrating the structure of a conventional liquid crystal display device of the type of double-sided display. In this liquid crystal display device 1, diffusion plates 13 and 14 are arranged on the front surface and on the back surface of a liquid crystal display panel 2, and a back light 3 comprising a source of light 9 and a light guide plate 10 is arranged on the back surface side of the liquid crystal display panel 2 through the diffusion plate 14 thereby to constitute a liquid crystal display portion 4 of the front surface side. Further, diffusion plates 15 and 16 are arranged on the front surface and on the back surface of a liquid crystal display panel 5, a back light 6 comprising a light source 11 and a liquid guide plate 12 is arranged on the back surface side of the liquid crystal display panel 5 through the diffusion plate 16 thereby to constitute a liquid crystal display portion 7 of the back surface side. The liquid crystal display portion 4 of the front surface side and the liquid crystal display portion 7 of the back surface side are overlapped back to back, and are partitioned by a double-sided reflector 8. The back lights 3 and 6 are turned on to illuminate the liquid crystal display panels 2 and 5 from the back surface sides, respectively.

In this liquid crystal display device, the two liquid crystal display portions comprising the liquid crystal display panel and the back light are arranged back to back resulting in an increase in the thickness of the liquid crystal display device arousing a problem in that equipment must have a large space for incorporating the liquid crystal display device. When the display is to be made on both surfaces, further, the two back lights must be turned on simultaneously, consuming electric power in increased amounts, which is not suited for portable equipment that uses rechargeable batteries. Besides, a back light and a liquid crystal display panel are necessary on the front surface side and on the back surface side, respectively, boosting up the cost.

Attempts have, therefore, been made to illuminate the liquid crystal display panels on both the front and back surfaces by using a single plane source of light. A liquid crystal display device of this kind has been disclosed in JP-A-2002-133906. FIG. 2 is a side view of the liquid crystal display device 21. FIG. 3 is a perspective view of a back light 22 used for the liquid crystal display device 21. The liquid crystal display device 21 of the type of emitting light from both surfaces includes liquid crystal display panels 23 and 24 arranged on both surfaces of the back light 22. In the back light 22, rod-like sources of light 26 such as cold cathode tubes are arranged at both edges of a light guide plate 25 in the form of a transparent flat plate, and leaving light control plates 28 are arranged on both surfaces of the light guide plate 25. A plurality of protruded portions 27 in the form of cylindrical lenses are formed on the surfaces of the leaving light control plates 28 facing the light guide plate 25, and the protruded portions 27 are intimately adhered at their central portions onto the surfaces of the light guide plate 25.

Light emitted from the rod-like sources of light 26 enters into the light guide plate 25 from the edges of the light guide plate 25 and propagates through the light guide plate 25. As shown in FIG. 4, light that has fallen on the contact surfaces between the protruded portions 27 and the light guide plate 25, falls on the leaving light control plates 28 from the light guide plate 25, totally reflected by the inner surfaces of the protruded portions 27 and goes out from the leaving light control plates 28 perpendicularly thereto. Therefore, upon arranging the liquid crystal display panel 23 and the liquid crystal display panel 24 on both sides of the back light 22, it is made possible to simultaneously illuminate the front and back liquid crystal display panels 23 and 24 by using one back light 22.

In this back light 22, however, light perpendicularly falling from the outer side as represented by a ray of light A in FIG. 4 transmits through the light guide plate 25 and the leaving light control plates 28, and goes out toward the front. When the transmission type liquid crystal display panels are used as liquid crystal display panels 23 and 24, therefore, light incident from the external side on one liquid crystal display panel, while the other liquid crystal display panel is being observed, transmits through the liquid crystal display panel and the back light, and is seen by the observer, arousing such problems that the image of the liquid crystal display panel of the back surface side is reflected on the image that is being observed and the color of the image is shaded.

DISCLOSURE OF THE INVENTION

It is an object of the present invention to provide a plane source of light of the type of emitting light from both surfaces featuring a good light utilization efficiency. The invention further provides a plane source of light of the type of emitting light from both surfaces permitting little external light to transmit through the display device even when it is combined with a display panel of the transmission type. The invention further provides an image display device using the above plane source of light.

A plane source of light according to the present invention comprises:

a source of light;

a light guide plate which confines light from the source of light, spreads light like a plane, and permits light to go out from the light-leaving surface and from at least a portion of the surface on the side opposite to the light-leaving surface; and a prism sheet arranged facing the side opposite to the light-leaving surface; wherein deflecting patterns are formed on the surface of the light guide plate on the side opposite to the light-leaving surface for reflecting light that propagates through the light guide plate;

light reflected by the deflecting patterns goes out from the light-leaving surface in a manner that the direction of a peak intensity thereof is nearly perpendicular to the light-leaving surface;

light goes out from the surface on the side opposite to the light-leaving surface in a manner that the direction of a peak intensity thereof is aslant relative to a direction perpendicular to the surface of the opposite side; and light going out from the surface on the opposite side is deflected by the prism sheet in a manner that the direction of a peak intensity thereof is nearly perpendicular to the surface on the opposite side.

In the plane source of light of the present invention, light emitted from the source of light falls on the light guide plate and spreads like a plane while propagating through the light guide plate. Of the light propagating through the light guide plate, the light falling on the deflecting patterns and is reflected by the deflecting patterns goes out from the light-leaving surface in a manner that the direction of a peak intensity thereof is nearly perpendicular to the light-leaving surface so as to illuminate the front surface side. Further, light goes out from the surface on the side opposite to the light-leaving surface of the light guide plate in a manner that the direction of a peak intensity is aslant, and is deflected through the prism sheet in a manner that the direction of a peak intensity thereof is nearly perpendicular to the surface on the opposite side to illuminate the back surface side. According to the plane source of light, therefore, light going out aslant from the back surface side of the light guide plate and is lost, is now bent through the prism sheet to a direction perpendicular thereto and is utilized for illumination to realize the plane source of light of the type of emitting light from both surfaces with scarcely decreasing the brightness on the surface of the front surface side.

In the plane source of light, further, the prism sheet is arranged facing the surface on the side opposite to the light-leaving surface of the light guide plate. Therefore, the external light such as sunlight and indoor illumination light falling on the back surface side perpendicularly thereto, is bent for its passage through the prism sheet and little goes out from the front surface side transmitting straight through the plane source of light. Further, the external light such as sunlight and indoor illumination light falling on the front surface side is bent for its passage through the prism sheet after it has transmitted through the light guide plate and little goes out from the back surface side transmitting straight through the plane-source of light.

The source of light according to the embodiment of the invention is a point source of light, and arcuate patterns are formed on the prism sheet with a position corresponding to the point source of light as nearly a center. When the source of light is a so-called point source of light, the patterns of the prism sheet are formed in an arculate shape with the position corresponding to the point source of light nearly as a center, so that light going out from the surface on the side opposite to the light-leaving surface is bent to a direction nearly perpendicular to almost entire of the surface on the opposite side. In the present invention, the point source of light stands for the one of which the light-emitting body therein has a size of not larger than 9 mm as a whole.

According to another embodiment of the invention, patterns of nearly a triangular shape in cross section are formed on the prism sheet, the patterns having, in cross section, a one-side vertical angle on the side of the source of light smaller than the one-side vertical angle on the opposite side. If the one-side vertical angle on the side of the source of light is selected to be smaller than that of the opposite side so that the vertexes of the patterns are deflected toward the side of the source of light, light going out from the light-leaving surface of the light guide plate and light going out aslant from the surface of the opposite side can be efficiently transmitted through the prism sheet so as to be guided in a direction nearly perpendicular to the surface on the opposite side.

According to a further embodiment of the invention, the deflecting patterns are of nearly a triangular shape in cross section, and an angle of inclination of slopes of the deflecting patterns on the light-leaving surface of the light guide plate and on at least a partial region on the surface on the opposite side on the side remote from the source of light, is different from an angle of inclination of slopes of the deflecting patterns in other regions on the side remote from the source of light. In this embodiment, the angle of inclination of slopes of the deflecting patterns on the side remote from the source of light are not all the same, and the quantities of light going out from the light-leaving surface and from the regions on the surfaces on the opposite side are adjusted depending upon the angles of inclination.

According to a still further embodiment of the present invention, the deflecting patterns are of nearly a triangular shape in cross section, the slopes thereof assuming at least a partly curved surface on the side remote from the source of light, and a curvature of slopes of the deflecting patterns on the light-leaving surface of the light guide plate and on at least a partial region on the surface on the opposite side on the side remote from the source of light, is different from a curvature of slopes of the deflecting patterns in other regions on the side remote from the source of light. In this embodiment, the slopes of the deflecting patterns are assuming at least a partly curved surface on the side remote from the source of light and, thus, the curvatures are not all the same. The quantities of light going out from the light-leaving surface and the regions on the surfaces on the opposite side are adjusted depending upon the curvatures.

The light source in still another embodiment of the invention is characterized by a spot light source, wherein the polarization pattern is arranged arcuate in form about the spot light source in a surface opposite to a light incident surface of the light-conductor plate. By providing the light source as a spot light source and arranging the polarization pattern arcuate in form about the spot light source, the light emitted from the spot light source and reflected by the polarization pattern can be less spread circumferentially with respect to the arc in the arrangement of the polarization pattern.

An image display device of the present invention comprises image display panels arranged facing the light-leaving surface of the plane source of light of the invention and facing the surface on the side opposite to the light-leaving surface.

The image display device of the present invention is capable of displaying images on both surfaces and of illuminating the image display panels on both sides by using one plane source of light of the invention suppressing the thickness of the image display device. Besides, the consumption of electric power is suppressed owing to its high light utilization efficiency. Further, since little external light transmits through the plane source of light, the external light falling from the other image display panel does not transmit through the observing side while the image display panel of the one side is being observed. Therefore, the image on the back surface side is not reflected on the image of the observing side, preventing shading of brightness.

The above constituent elements of the invention can be arbitrarily combined together as much as possible.

BRIEF DESCRIPTION OF THE DRAWINGS

FIG. 12A is a plan view of a light guide plate provided with deflecting patterns, FIG. 12B is a view illustrating a portion A of FIG. 12A on an enlarged scale, FIG. 12C is a view illustrating a portion B of FIG. 12A on an enlarged scale, and FIG. 12D is a view illustrating a portion C of FIG. 12A on an enlarged scale;

BEST MODE FOR CARRYING OUT THE INVENTION

The embodiments of the present invention will next be concretely explained. However, the present invention is not limited to the following embodiments, but can be naturally modified in the scope not departing from the technical idea of the present invention.

DESCRIPTION OF THE PREFERRED EMBODIMENTS

First Embodiment

Figure 5:
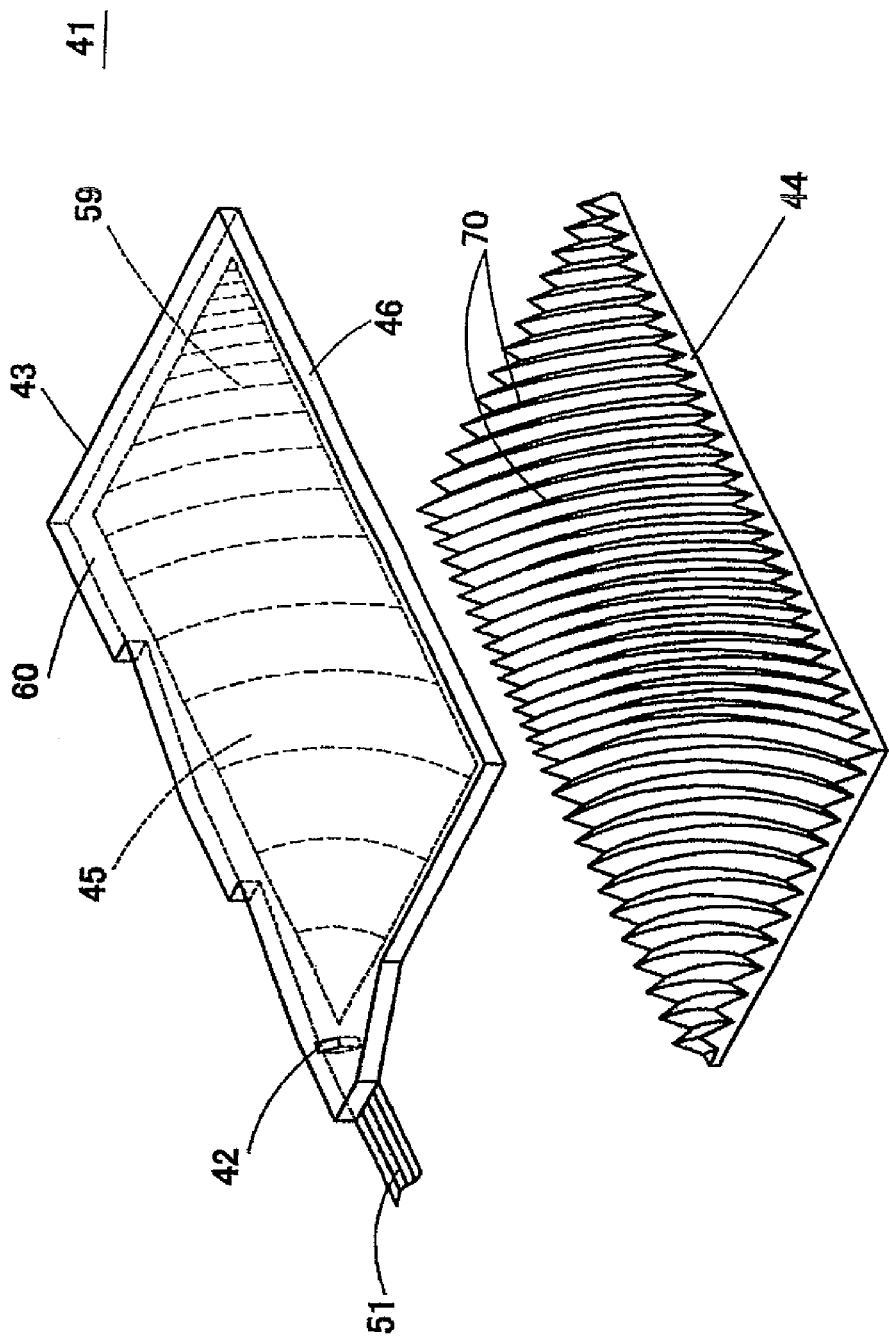
FIG. 5 is a disassembled perspective view of a plane source of light according to a first embodiment of the present invention.
Figure 6:
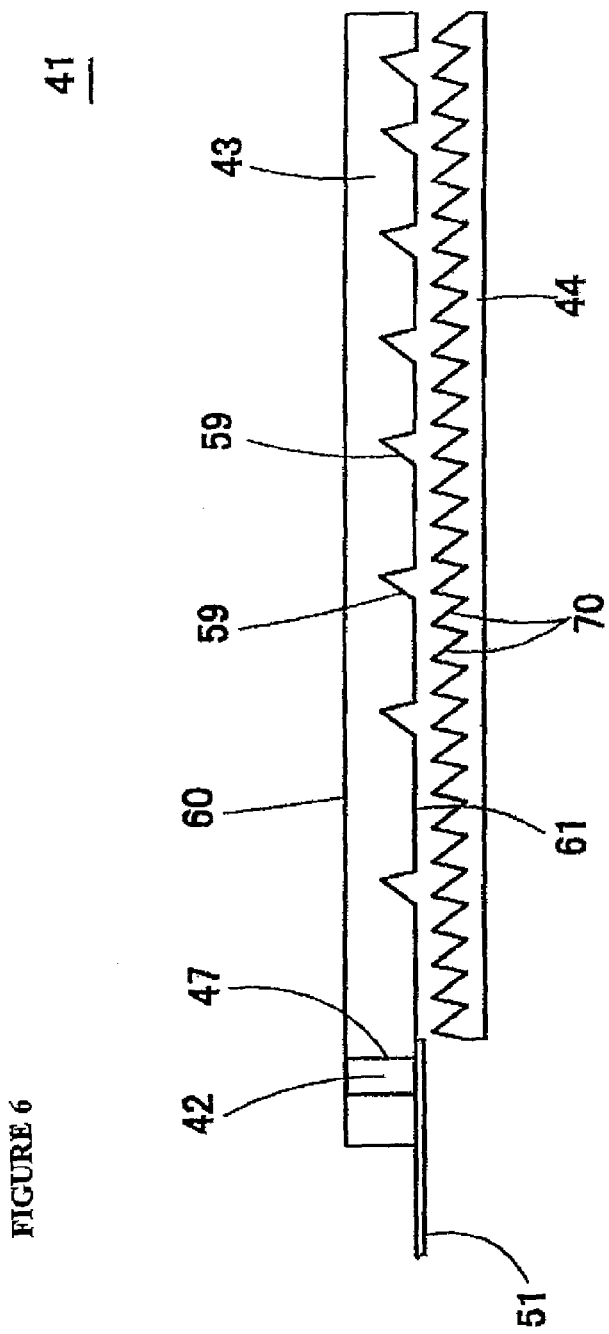
FIG. 6 is a side view of the above plane source of light.

FIG. 5 is a disassembled perspective view illustrating the constitution of a plane source of light 41 according to a first embodiment of the present invention, and FIG. 6 is a side view thereof. The plane source of light 41 is constituted by a point source of light 42, a light guide plate 43 and a prism sheet 44, the point source of light 42 being buried in a corner portion of the light guide plate 43 and the prism sheet 44 facing the back surface of the light guide plate 43.

Figure 7:
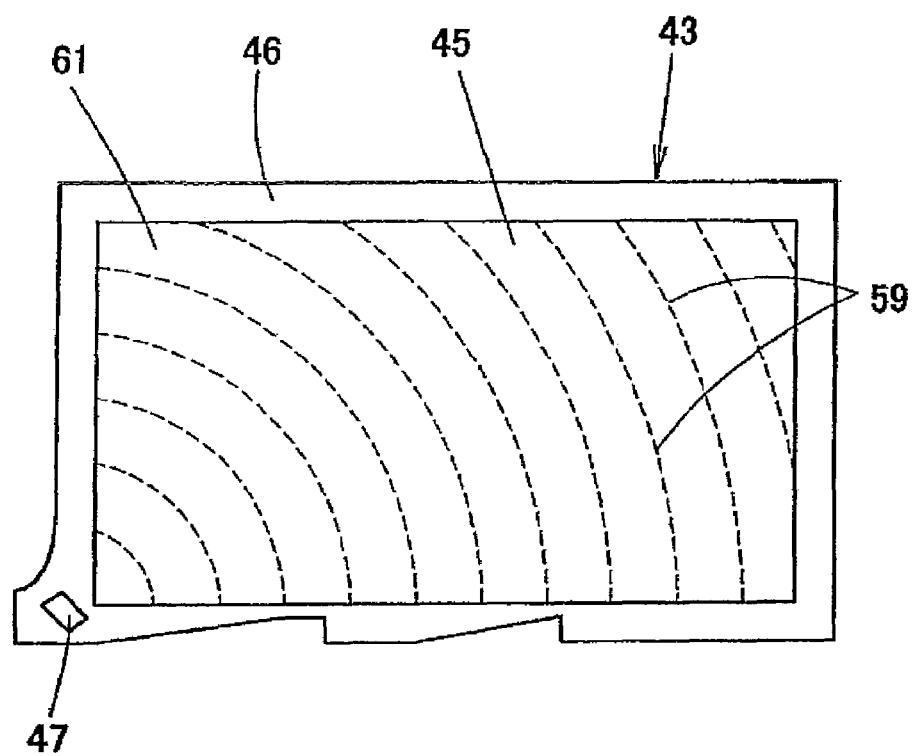
FIG. 7 is a back view of a light guide plate used for the above plane source of light.

The light guide plate 43 is formed like a nearly rectangular flat plate by using a transparent resin or a glass having a high refractive index, such as a polycarbonate resin, an acrylic resin or methacrylic resin. FIG. 7 is a back view of the light guide plate 43. On the back surface of the light guide plate 43, a planar light-emitting region 45 of a rectangular shape that substantially becomes a plane source of light is surrounded by a non-emitting region 46, and a hole 47 for fitting the point source of light 42 is perforated in an outer portion (non-emitting region 46) of the planar light-emitting region 45 at an end of a short side of the light guide plate 43 of the rectangular form. The point source of light 42 is obtained by molding a light-emitting diode chip with a resin, is mounted on a film wiring board (FPC) 51 for feeding electric power to the point source of light 42, and is inserted in the hole 47 in the light guide plate 43.

Figure 8:
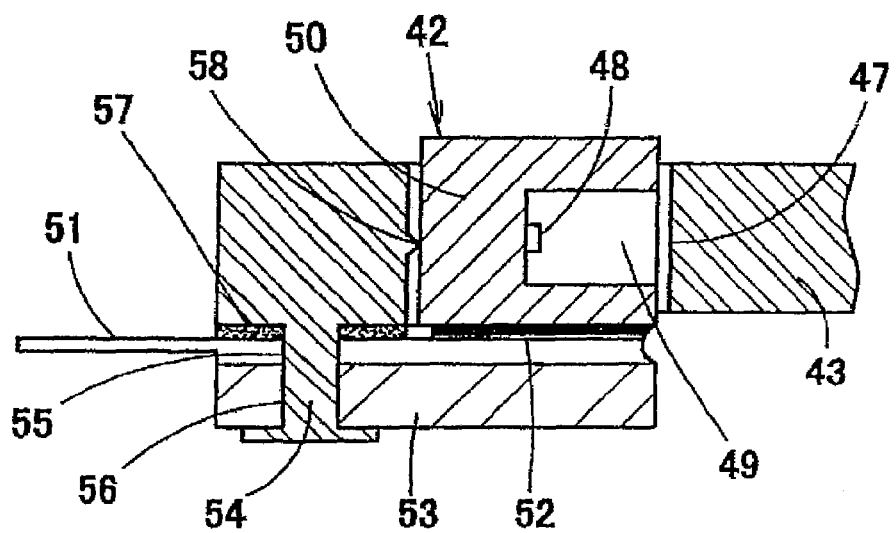
FIG. 8 is a sectional view illustrating a state where a point source of light is mounted on the light guide plate on an enlarged scale.

FIG. 8 is a sectional view illustrating the structure of the point source of light 42. The point source of light 42 is obtained by sealing a light-emitting diode chip 48 in a transparent resin 49, and the surfaces thereof, except the front surface, are covered with a white transparent resin 50. The point source of light 42 is mounted on the film wiring board 51 and is fixed thereto by a solder 52. Further, the film wiring board 51 is fixed onto a reinforcing plate 53 made of a glass epoxy resin. As described above, the hole 47 for fitting the point source of light 42 is penetrating up and down through the corner portion of the light guide plate 43, and a positioning pin 54 is protruding from the lower surface of the light guide plate 43 at the vicinity thereof. Through holes 55 and 56 are perforated in the film wiring board 51 and in the reinforcing plate 53 for passing a positioning pin 54.

An ultraviolet-ray curing adhesive (which may be a thermosetting adhesive) 57 is applied to the lower surface of the light guide plate 43 surrounding the base portion of a positioning pin 54. The positioning pin 54 is passed through the holes 55 and 56 in the film wiring board 51 and in the reinforcing plate 53, the positioning is effected for the center of the light guide plate 43 in the direction of thickness and for the light-emitting center of the point source of light 42 by using a CCD camera or the like, the ultraviolet-ray curing adhesive 57 is cured by the irradiation with an ultraviolet ray to adhere the light guide plate 43 and the point source of light 42 together, and the positioning pin 54 is thermally caulked to the reinforcing plate 53.

Here, as shown in FIG. 8, the center of the point source of light 42 may be positioned by a protuberance 58 formed on the inner surface (on the back surface side or on the front surface side of the point source of light 42, or on both of them) of the hole 47 in the light guide plate 43. Further, though not shown, the center of the light guide plate 43 and the center of the point source of light 42 may be positioned by using a jig with steps for positioning the upper surface of the light guide plate 43 and the upper surface of the point source of light 42 in a state where the light guide plate 43 and the point source of light 42 are turned upside down.

A glass epoxy wiring board or a lead frame may be used instead of the film wiring board 51. When two or more light-emitting diode chips are to be used, a plurality of light-emitting diode chips may be collected at one place to use them as a point of source of light. Further, the point source of light 42 may be formed by directly inserting the light-emitting diode chip in the light guide plate 43 or by arranging the light-emitting diode chip on an outer portion of the light guide plate 43 (position facing the outer peripheral surface of the light guide plate 43).

Figure 9:
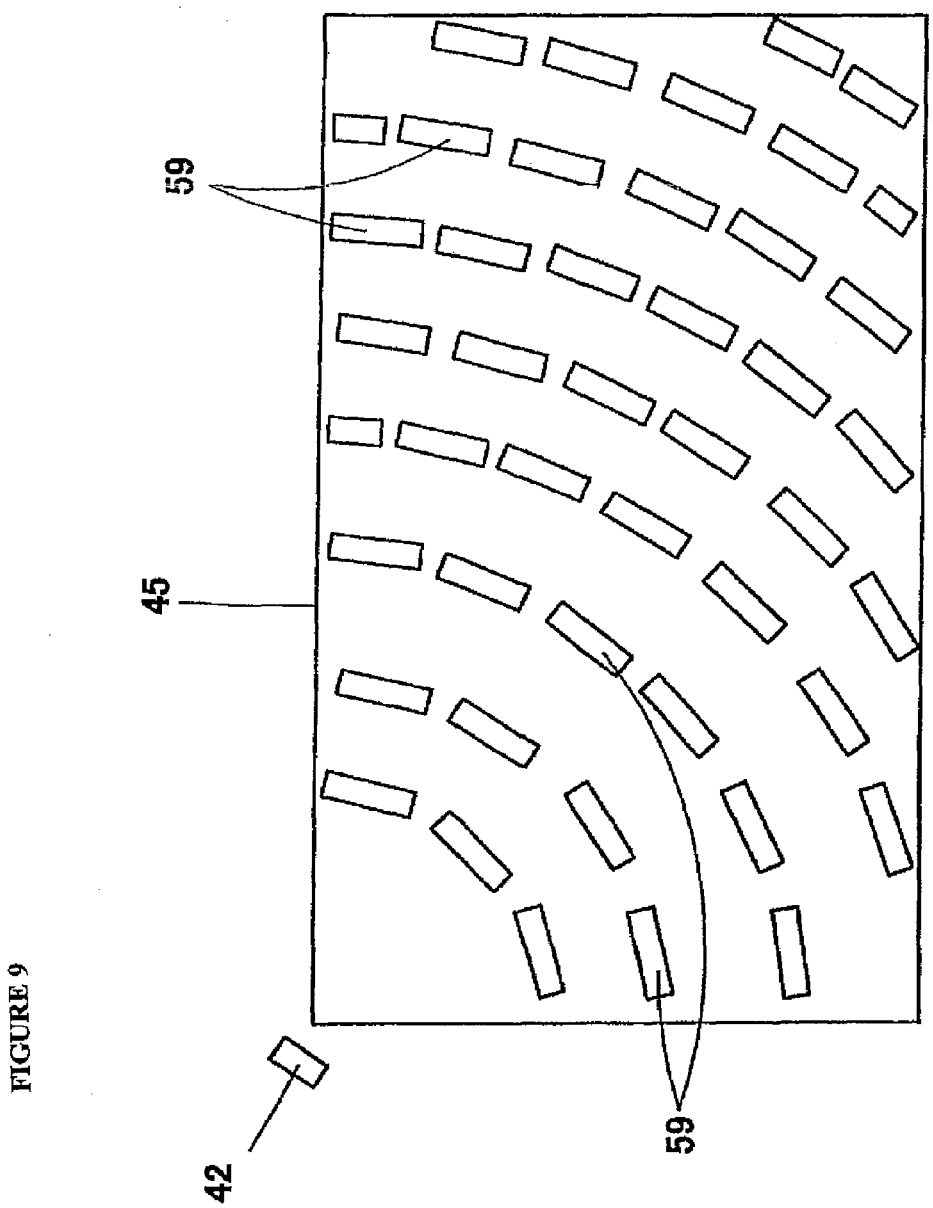
FIG. 9 is a view schematically illustrating the arrangement of deflecting patterns provided on the light guide plate of FIG. 7.

Referring to FIG. 9, on the planar light-emitting region on the back surface of the light guide plate 43, there are provided, in a recessed manner, a plurality of or many deflecting patterns 59 in the form of a triangular prism in a concentric manner with the point source of light 42 as a center. The distance among the deflecting patterns 59 is relatively broad on the side close to the point source of light 42 and becomes gradually narrower as they go away from the point source of light 42, such that brightness is uniform on the front surface of the light guide plate 43 (hereinafter referred to as light-leaving surface 60) and on the back surface thereof (hereinafter referred to as pattern surface 61). The deflecting patterns 59 will now be described in detail.

FIGS. 10A and 10B are a plan view and an enlarged sectional view of the shape of the defecting pattern 59. The above deflecting pattern 59 has nearly a uniform cross section in the direction of length thereof, the direction of length thereof being nearly perpendicular to the direction that couples to the point source of light 42. The deflecting pattern 59 used in this embodiment is slightly winding as shown in FIG. 10A. Referring to FIG. 10B, each deflecting pattern 59 comprises a deflecting and inclining surface 62 positioned on the side of the point source of light and a re-falling surface 63 being positioned on the side remote from the point source of light 42. A nearly triangular shape in cross section is formed by the deflecting and inclining surface 62 and the re-falling surface 63. It is desired that the angle of inclination γ of the deflecting and inclining surface 62 and the angle of inclination δ of the re-falling surface 63 are,

γ<δ

γ=45° to 65°

δ=80° to 90°

It is particularly desired that the angle of inclination γ of the deflecting and inclining surface 62 is nearly 50°.

Figure 11:
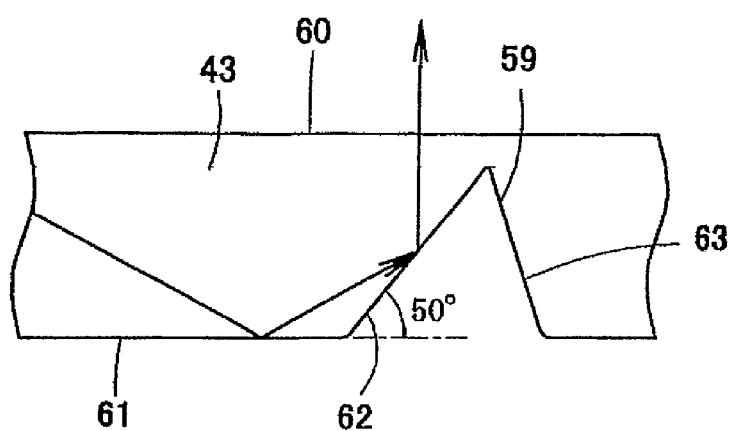
FIGS. 11A and 11B are sectional views illustrating the action of the deflecting pattern.
Figure 11:
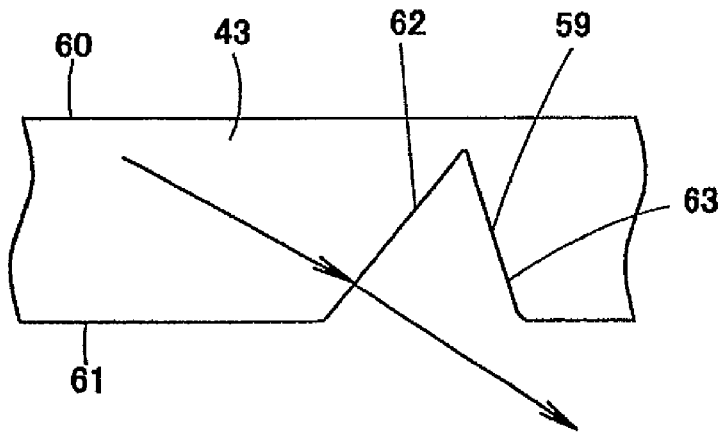

Light emitted from the point source of light 42 passes through the inner wall surface of the hole 47 and falls on the light guide plate 43. Light that has fallen on the light guide plate 43 is totally reflected repetitively between the front surface of the light guide plate 43 (light-leaving surface 60) and the back surface (pattern surface 61), i.e., propagates through the light guide plate 43 and spreads like a plane over the whole planar light-emitting region 45 of the light guide plate 43. While propagating, light falling on the deflecting and inclining surface 62 of the deflecting pattern 59 from the lower side is totally reflected by the deflecting and inclining surface 62 toward the light-leaving surface 60 as shown in FIG. 11A, and goes out from the light-leaving surface 60 in a manner that the direction of the greatest intensity of light is nearly perpendicular to the light-leaving surface 60. While propagating, further, light falling on the deflecting and inclining surface 62 of the deflecting pattern 59 from the upper side transmits through the deflecting and inclining surface 62 as shown in FIG. 11B, and goes out from the pattern surface 61 in a manner that the direction of the greatest intensity of light is aslant relative to the pattern surface 61. Therefore, the ray of light propagating through the light guide plate 43 and the light leaving the light-leaving surface 60 and the pattern surface 61, travel in nearly a radial direction with the point source of light 42 as a center without much scattered in the transverse direction (circumferential direction with the point source of light 42 as a center) if viewed from a direction perpendicular to the light-leaving surface 60.

Figure 13:
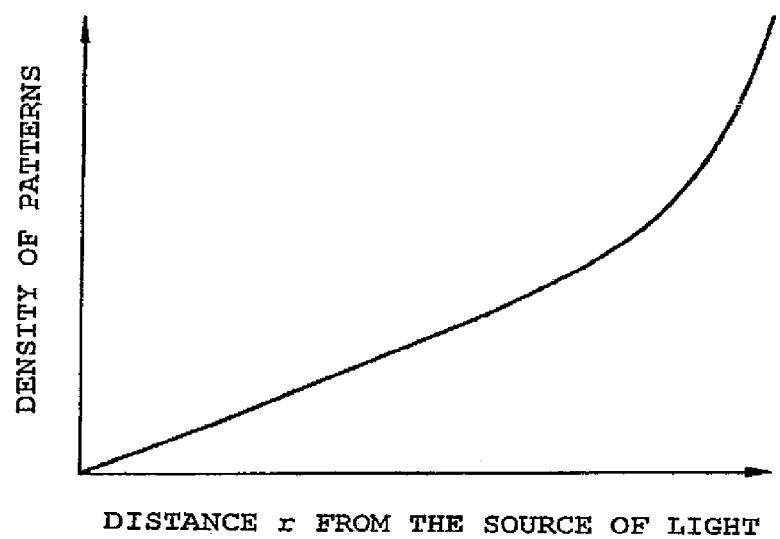
FIG. 13 is a diagram illustrating a relationship between the distance from a point of source of light and the density of the deflecting patterns in the light guide plate.
Figure 14:
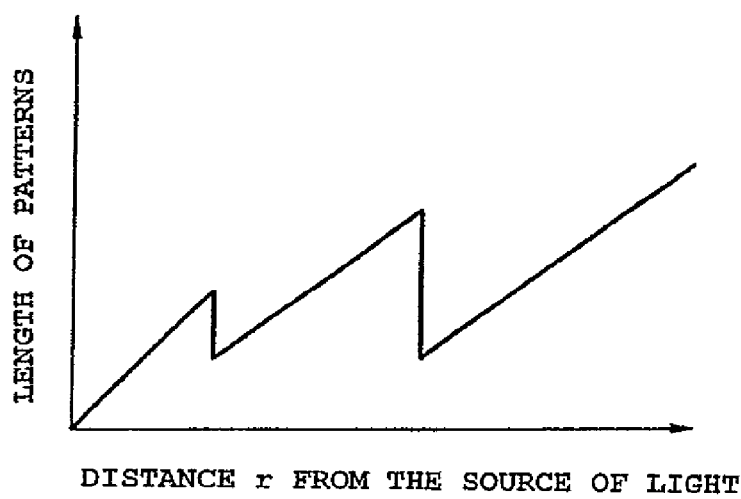
FIG. 14 is a diagram illustrating a relationship between the distance from a point of source of light and the length of the deflecting patterns in the light guide plate.
Figure 15:
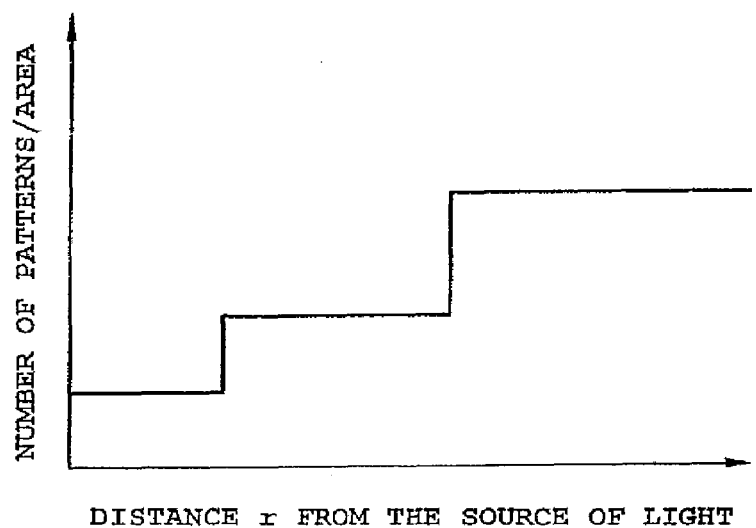
FIG. 15 is a diagram illustrating a relationship between the distance from a point of source of light and the number density of the deflecting patterns (number of patterns/area) in the light guide plate.

FIGS. 12A, 12B, 12C and 12D illustrate the arrangement of the whole deflecting patterns 59, FIG. 13 illustrates a change in the density (area ratio) of the deflecting patterns 59 in the radial direction, FIG. 14 illustrates a change in the length of the pattern, and FIG. 15 illustrates a change in the number of patterns per a unit area. In these drawings, r denotes a distance from the point source of light 42. Referring to FIG. 13, the density of the deflecting patterns 59 increases with an increase in the distance r from the point source of light 42. This is to uniform the brightness on the light-leaving surface 60 and on the pattern surface 61. The density of the deflecting patterns can be gradually increased by gradually increasing the number of the deflecting patterns per a unit area. In this embodiment, however, the light guide plate 43 is divided into a plurality of circular belt zones depending upon the distance from the point source of light 42. In each zone, the number of the deflecting patterns is constant per a unit area as shown in FIG. 15. The number of the deflecting patterns per the unit area is increased stepwise depending upon the zones, and the length of the deflecting patterns is gradually varied in each zone as shown in FIG. 14. The length of the pattern is once shortened at the boundary of the zone.

Figure 10:
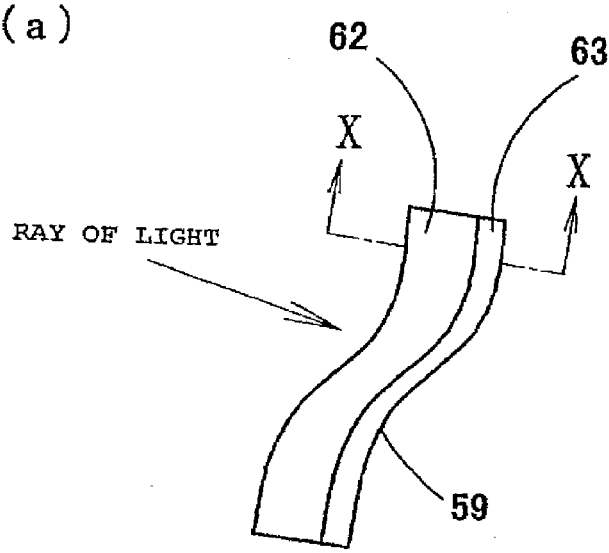
FIG. 10A is a plan view illustrating a deflecting pattern that is winding on an enlarged scale.
FIG. 10B is a sectional view along the line X-X in FIG. 10A.
Figure 10:
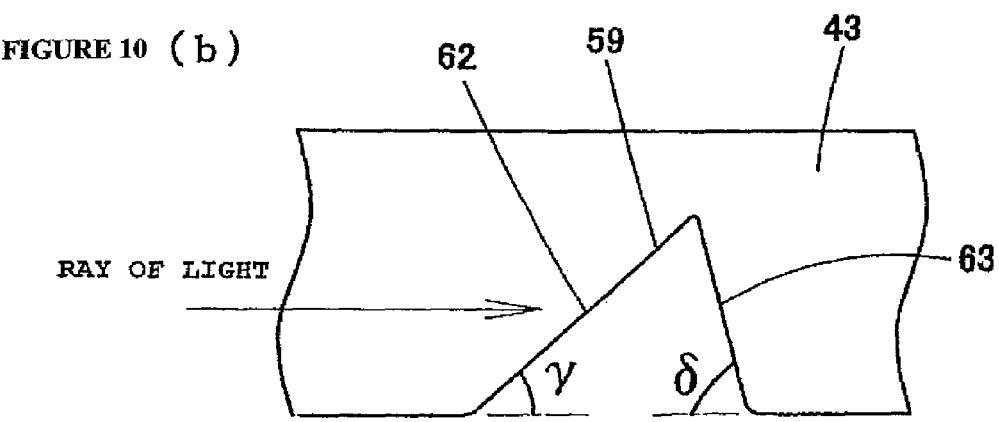

FIGS. 12B, 12C and 12D concretely illustrate the deflecting patterns 59 at the portions A, B and C in FIG. 12A. FIG. 12B illustrates a region A closest to the point source of light 42 where the pitch of the deflecting patterns 59 is 140 μm in both the radial direction and the circumferential direction, and the deflecting pattern 59 on the inner side is not overlapping the deflecting pattern 59 on the outer side in the radial direction. FIG. 12C illustrates an intermediate region B where the pitch of the deflecting patterns 59 is 70 μm in both the radial direction and the circumferential direction, and the deflecting patterns 59 on the inner side are overlapping the deflecting patterns 59 on the outer side by two columns. FIG. 12D illustrates a region C remote from the point source of light 42 and where the pitch is 35 μm in the radial direction and is 140 μm in the circumferential direction. Though FIGS. 12B, 12C and 12D have illustrated deflecting patterns extending straight, the deflecting patterns 59 may be winding as shown in FIG. 10 and may be arranged as shown in FIGS. 12B, 12C and 12D.

Figure 16:
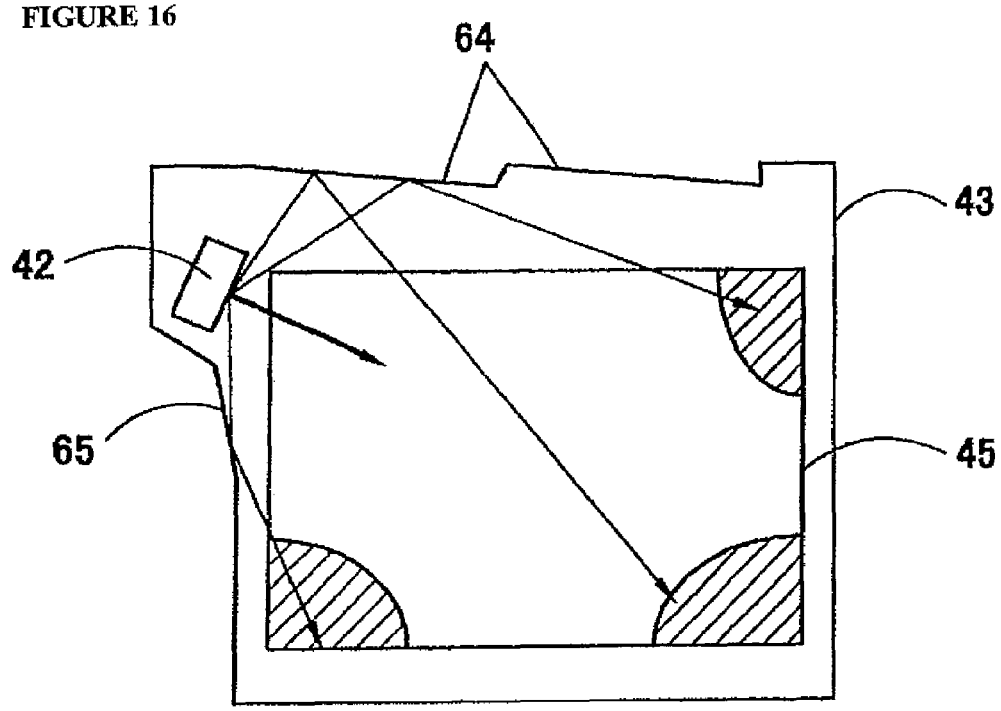
FIG. 16 is a view illustrating a structure for transmitting as much light as possible to the corners of the light-leaving surface in the plane source of light of the invention and its action.

The long side of the light guide plate is formed straight on the side opposite to the end where the point source of light 42 is arranged while the long side of the light guide plate on the side close to the point source of light 42 is cut in one or a plurality of inclined steps. Similarly, the short side is partly cut in an inclined manner near the point source of light 42. Upon forming inclined surfaces 64 and 65 on the long side and on the short side close to the point source of light 42, as shown in FIG. 16, part of light emitted from the point source of light 42 can be totally reflected by the inclined surface 64 of the long side and the inclined surface 65 of the short side, and can be transmitted to the corner portions of the light guide plate 43 (hatched regions in FIG. 16). When the point source of light 42 is placed at a corner of the light guide plate 43, other corners tend to be darkened. According to this structure, however, light totally reflected by the inclined surfaces 64 and 65 is transmitted to the corner portions of the planar light-emitting region 45 of the light guide plate 43 to further uniform the brightness distribution on the light-emitting surface 60 and on the pattern surface 61 contributing to improving the efficiency of the plane source of light 41.

Figure 17:
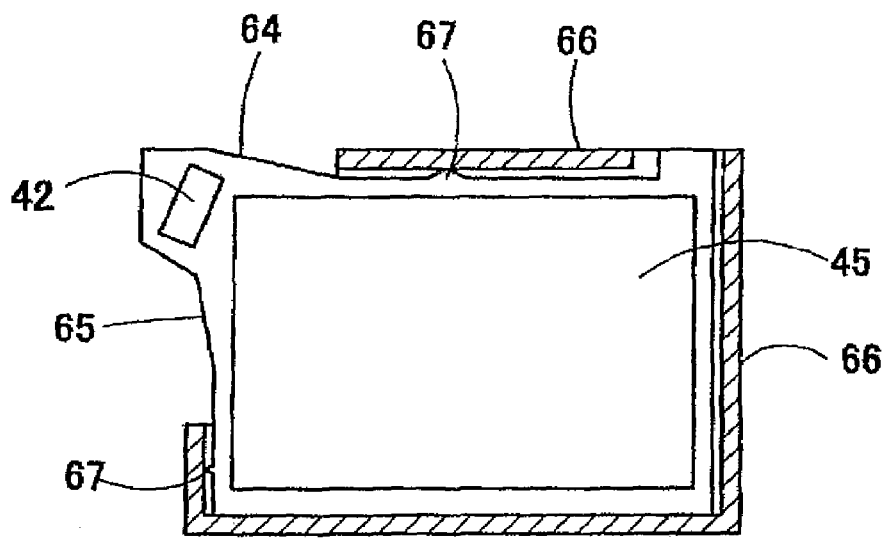
FIG. 17 is a view schematically illustrating a light guide plate fitted with a fixing frame 66.

When a fixing frame 66 is attached to the light guide plate 43 as shown in FIG. 17, the inclined surfaces 64 and 65 of the light guide plate 43 tend to be scratched if the inclined surfaces 64 and 65 for reflecting light are intimately adhered to the fixing frame 66, and the reflection performance may be impaired. To prevent this, a small protuberance 67 is provided on a portion of, or in the vicinity of, the inclined surfaces 64, 65 for reflecting light, and the light guide plate 43 is brought into contact with the fixing frame 66 via the protuberance 67 forming a gap between the inclined surfaces 64, 65 and the fixing frame 66.

Figure 18:
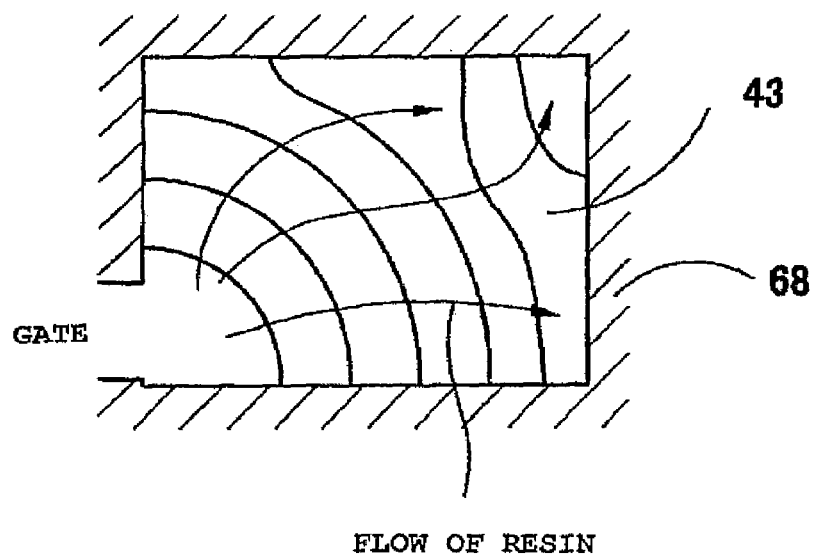
FIG. 18 is a view illustrating the flow of a resin at the time of forming a light guide plate of a rectangular shape in a rectangular cavity of a metal mold.

If it is attempted to directly mold the light guide plate 43 of a rectangular shape by using a resin, the patterns cannot be uniformly transferred over the whole surface due to non-uniform flow of the resin in the metal mold 68 as shown in FIG. 18, and the light guide plate 43 tends to be warped. It is, however, possible to form a light guide plate 43 by preparing a metal mold 68 in a size greater than the light guide plate 43 that is to be obtained, by molding the light guide plate 69 of a fan shape or of a semicircular shape in a size that is slightly great by using the metal mold 68 and by suitably cutting the light guide plate 43. Thus, the light guide plate 69 of a size slightly great featuring good resin fluidity is molded and is cut to obtain the desired light guide plate 43. In molding the light guide plate 69 of a size slightly great, therefore, the resin flows uniformly in either direction, making it possible to transfer the pattern which is uniform over the whole surface and causing the light guide plate 43 to be warped little.

Described below is the size of the plane source of light 41 shown in FIG. 5, i.e., the short side of the light guide plate 43 has a length of 33 mm, the long side thereof has a length of about 43 mm (about 47 mm inclusive of the portion mounting the source of light), and a thickness of 0.1 mm. The non-emitting region 46 of the light guide plate 43 has a width of 0.2 mm. Further, the light-emitting diode which is the point source of light 42 has a width of about 25 mm and a depth of 1.3 mm.

Figure 20:
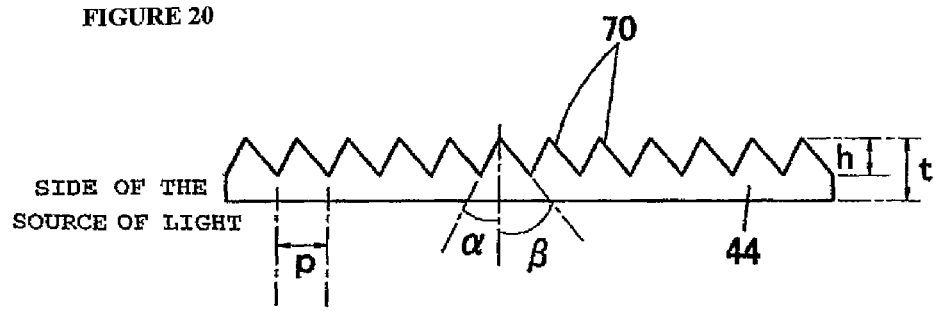
FIG. 20 is a sectional view of a prism sheet.

The prism sheet 44 is shown in FIG. 5. FIG. 20 is a sectional view of the prism sheet 44. A plurality of prisms 70 of an arcuate shape are formed on the upper surface of the prism sheet 44. The prisms 70 are formed in an arcuate shape with a position corresponding to the point source of light 42 as a center. Each prism 70 has a triangular shape in cross section and its vertex is inclined toward the point source of light. Namely, referring to FIG. 20, if a one-side vertical angle of the prism 70 on the side close to the point source of light 42 is denoted by α and a one-side angle on the opposite side by β, α=10° to 40° and β=25° to 55° (where α<β). Further, if the pitch of the prisms is denoted by p, the thickness of the prism sheet 44 by t and the height of the prisms 70 by h, then, the pitch p is 30 μm, the thickness t is 100 to 500 μm and the height h is 18 to 32 μm. The prism sheet 44 as a whole may be molded by using a transparent resin or the prisms 70 of a transparent resin may be formed on the glass substrate.

Figure 21:
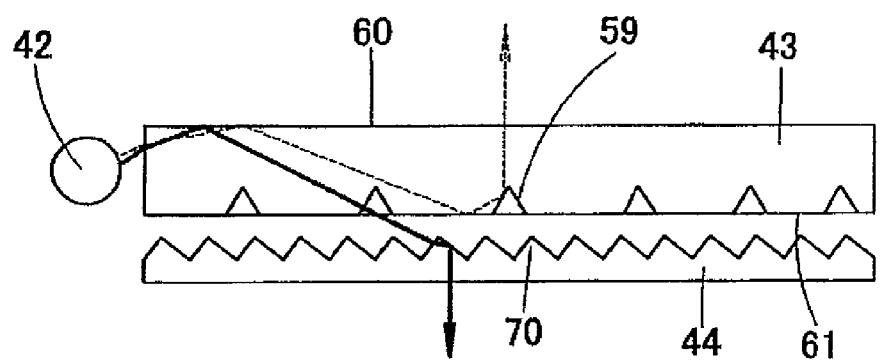
FIG. 21 is a view illustrating the action of the plane source of light of the invention.

Next, described below are the action and effect of the plane source of light 41 according to the invention. FIG. 21 is a view schematically illustrating the action of the plane source of light 41. Light emitted from the point source of light 42 enters into the light guide plate 43 from the surface of the light guide plate 43 where light falls, propagates while being totally and repetitively reflected between the front surface (light-leaving surface 60) and the back surface (pattern surface 61) of the light guide plate 43, and spreads over the whole light guide plate 43. Light propagating through the light guide plate 43 may be reflected by the pattern surface 61 and may, then, fall on the deflecting pattern 59 from the side of the back surface as indicated by an arrow of a broken line in FIG. 21. The light is, then, totally reflected by the deflecting and inclining surface 62 of the deflecting pattern 59 toward a direction nearly perpendicular to the light-emitting surface 60, and goes out from the light-leaving surface 60 in a direction nearly perpendicular thereto. Thus, light goes out from the whole planar light-emitting region 45 of the light-leaving surface 60 toward a direction perpendicular to the light-leaving surface 60 to illuminate the front surface side.

Further, light propagating through the light guide plate 43 may fall on the deflecting pattern 59 from the side of the front surface thereof as indicated by an arrow of a solid line in FIG. 21. The light, then, transmits through the deflecting and inclining surface 62 and goes out in a direction inclined from a perpendicular to the pattern surface 61. The light going out aslant from the pattern surface 61 falls on the prism sheet 44, refracted and deflected by the prism 70, and goes out in a direction nearly perpendicular to the pattern surface 61. Thus, light going out from the whole planar light-emitting region 45 of the pattern surface 61 toward a direction perpendicular to the pattern surface 61 illuminates the back surface side. According to the plane source of light 41 of this invention as described above, illumination light goes out like a plane from both the front and back surfaces of the light guide plate 43 toward the direction of the front surface side and toward the direction of the back surface side. Therefore, the plane source of light 41 of the invention can be used as a plane source of light of the type of emitting light from both surfaces.

Here, the prisms 70 formed on the prism sheet 44 have an asymmetrical shape in cross section in which the one-side vertical angle α on the side close to the point source of light 42 is smaller than the one-side vertical angle β on the opposite side (see FIG. 20). Therefore, this shape is suited for changing the angle of light leaving the pattern surface 61 aslant in a direction to go away from the point source of light 42 outward perpendicularly to the pattern surface 61 of the light guide plate 43, into a direction perpendicular to the pattern surface 61 through the prism sheet 44.

FIG. 22A illustrates the point source of light 42, the light guide plate 43 and the direction of light in which light goes out from the light guide plate 43. The point source of light 42 and the light guide plate 43 (without prism sheet 44) used in this embodiment are often used as a back light of the type of emitting light from one surface. In this case, light going out from the light-leaving surface 60 of the light guide plate 43 becomes the illumination light, and light going out aslant from the pattern surface 61 results in a loss of light. To prevent this light from straying in the device, a reflector 71 is provided facing the pattern surface 61 as shown in FIG. 22B in the case of the back light of the type of emitting light from one surface, so that light going out aslant from the pattern surface 61 is reflected by the reflector 71 to fall again in the light guide plate 43 before being emitted to the front surface side.

In the plane source of light 41 of the type of emitting light from both surfaces of the invention, light that used to become a loss is refracted by the prism sheet 44 and is utilized for illuminating the back surface side, enabling light to be emitted from both surfaces. As compared to the case when light is emitted from the one surface, therefore, light can be emitted from the back surface with scarcely lowering the front brightness on the side of the front surface, making it possible to fabricate a plane source of light of the type of emitting light from both surfaces maintaining a high light utilization efficiency.

In the plane source of light 41 of the present invention, even when the external light is falling from the side of the front surface perpendicularly thereto, the external light transmitting through the light guide plate 43 perpendicularly thereto goes out being bent aslant due to the prism sheet 44. Therefore, the external light little goes out from the side of the back surface to the direction of observation (to the front side). Further, the external light perpendicularly falling from the side of the back surface is bent aslant by the prism sheet 44 and enters into the light guide plate 43. Therefore, the external light little goes out from the side of the front surface to the direction of observation (to the front side). As will be described later, therefore, even when the liquid crystal display panels of the transmission type are arranged on both the front and back surfaces of the plane source of light 41 to fabricate a liquid crystal display device of the double-sided display type, brightness is shaded little on the screens. For example, when the external light falls from the side of the back surface and transmits through the side of the front surface while the user is observing the image of the liquid crystal display panel on the front surface side, the image of the liquid crystal display panel on the back surface side is seen through from the front surface side or the external light is seen from the front surface side, causing the brightness to be shaded on the image being observed and deteriorating the quality of the image. By using the plane source of light 41 of the present invention, however, the external light falling from the back surface side does not transmit through the front surface side. Therefore, the image on the back surface side is not reflected on the front surface side or the external light from the front surface side is not seen through, improving the quality of the liquid crystal display device. The same holds even when the external light is falling from the front surface side perpendicularly thereto while observing the image on the back surface side.

Figure 24:
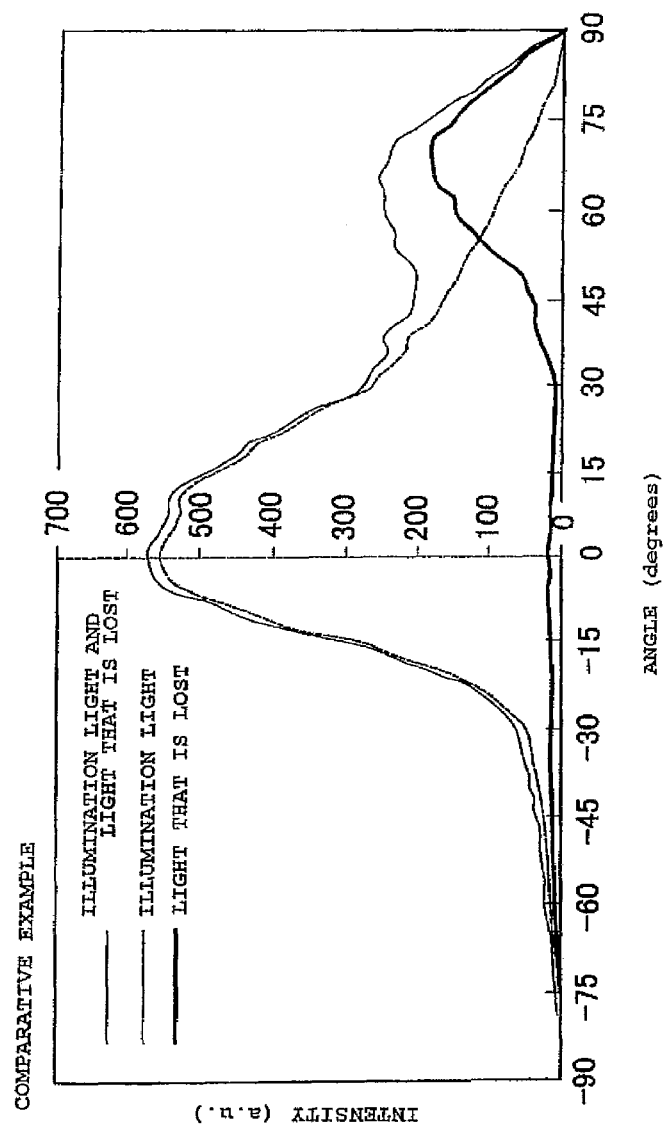
FIG. 24 is a diagram illustrating directivity characteristics of light going out from the light guide plate in the comparative example of FIG. 22B.

FIG. 24 is a diagram illustrating the directivity characteristics of illumination light totally reflected by the deflecting patterns 59 and is going out from the light-leaving surface 60 and of light that is lost going out aslant from the pattern surface 61, reflected by the reflector 71 and going out from the light-leaving surface 60 (or light that is lost going out from the pattern surface 61 in FIG. 22A) in the comparative example in which the reflector 71 is arranged on the back surface side of the light guide plate 43 as shown in FIG. 22B, and the sum of the two, the ordinate representing the intensity of light that is going out (arbitrary unit) and the abscissa representing the angle of light going out with respect to a perpendicular to the light-leaving surface 60. In the light guide plate 43 used here, the re-falling surface 63 of the deflection pattern 59 is constituted by a flat surface and a curved surface (see FIG. 27B), the angle of inclination γ of the deflecting and inclining surface 62 is 50°, the angle of inclination δ of the flat portion of the re-falling surface 63 is 80° and the radius of curvature R of the curved portion is 1.5 μm. As will be understood from the directivity characteristics of FIG. 24, light that is lost has a large intensity in a direction inclined by about 30° to about 90° with respect to a perpendicular to the light-leaving surface 60, and is not contributing to the brightness in front.

Figure 25:
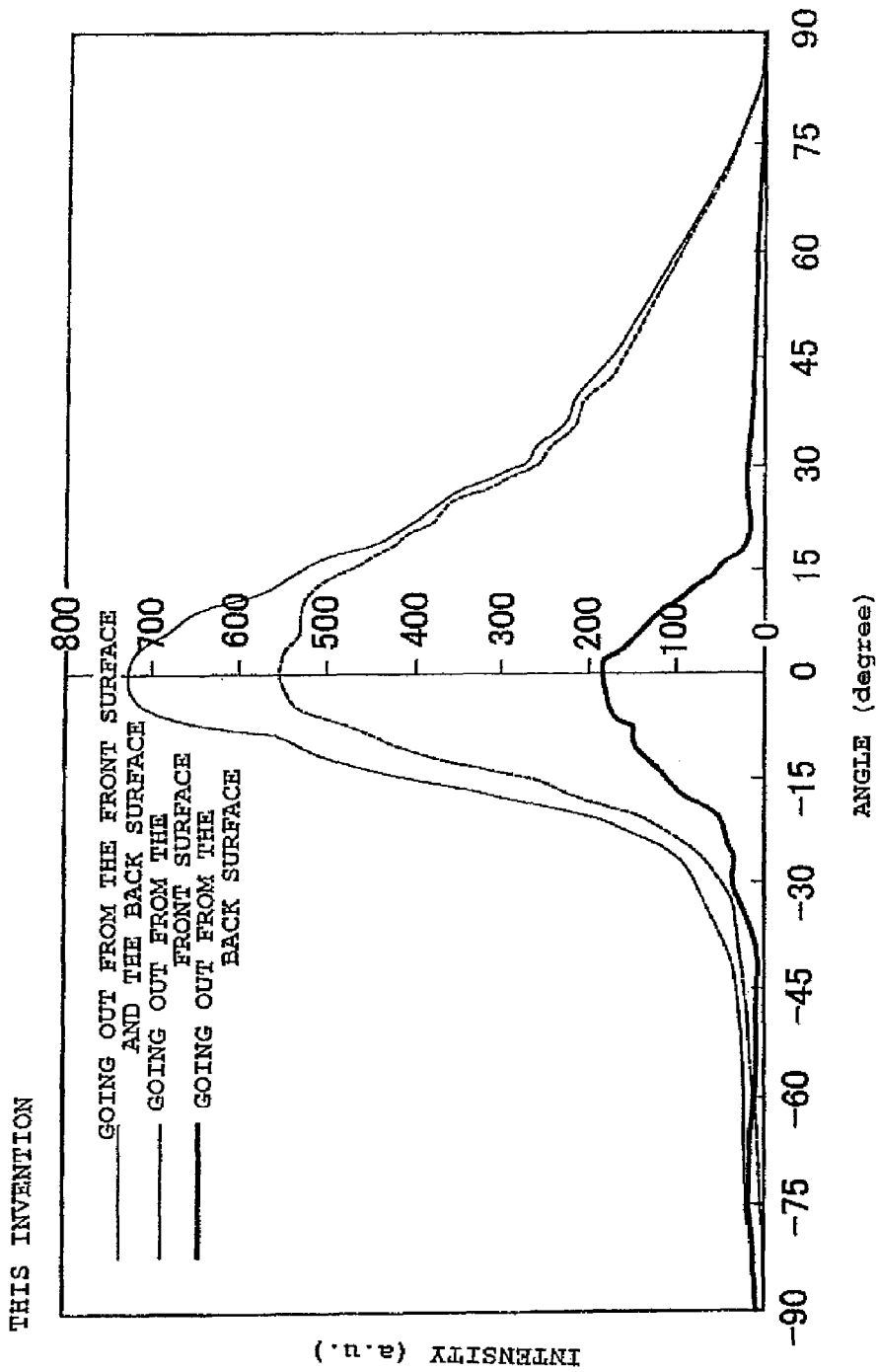
FIG. 25 is a diagram illustrating directivity characteristics of illumination light going out from the plane source of light of the invention.

FIG. 25 is a diagram illustrating directivity characteristics of illuminating light on the front surface side going out from the light-leaving surface 60 and of illumination light on the back surface side going out from the pattern surface 61 and transmitted through the prism sheet 44 in the plane source of light 41 of the invention, and the sum of the two, the ordinate representing the intensity of light that is going out (arbitrary unit) and the abscissa representing the angle of light going out with respect to a perpendicular to the light-leaving surface 60 or with respect to a perpendicular to the pattern surface 61. The light guide plate 43 used here is the same as the one used for taking a measurement in FIG. 24. The prism sheet 44 used here has a thickness t of 125 μm, the prism 70 has a pitch p of 30 μm, a height h of 32 μm, an inclination α of 20° (on the side close to the point source of light) and an inclination β of 30° (on the side remote from the point source of light). When these directivity characteristics are compared with the directivity characteristics of FIG. 24, the front brightness on the front surface side is nearly equal to the brightness of illumination light of FIG. 24, eliminating the loss of light of FIG. 24 and turning it into the front brightness of illumination light on the back surface side. Therefore, even when the characteristics of the whole emitted light (illumination light and light that is lost) shown in FIG. 24 are compared with the characteristics of the whole light going out (leaving the front surface and the back surface) shown in FIG. 25, it will be understood that the light going out according to the present invention is all collected in front to enhance the light utilization efficiency.

Next, described below is the sectional shape of the deflecting patterns 59 of the light guide plate 43. FIGS. 26A and 26B illustrate deflecting patterns 59 of triangular shapes in cross section. The angle of inclination γ of the deflecting and inclining surface 62 is so determined that the light is totally reflected and goes out from the light-leaving surface 60 in a direction perpendicular thereto. If the angle of inclination δ of the re-falling surface 63 is increased as shown in FIG. 26B, light that has fallen on the deflecting and inclining surface 62 and has transmitted through the deflecting and inclining surface 62 can be partly caused to fall again on the re-falling surface 63 to enter into the light guide plate 43, making it possible to decrease the quantity of light leaving the pattern surface 61 to the back surface side. Further, if the angle of inclination δ of the re-falling surface 63 is decreased, light that has fallen on the deflecting and inclining surface 62 and has transmitted through the deflecting and inclining surface 62, is little trapped by the re-falling surface 63 as shown in FIG. 26A, making it possible to increase the quantity of light that is going out from the pattern surface 61 to the back surface side. Upon changing the angle of inclination γ of the deflecting and inclining surface 62 of the deflecting patterns 59 for every region of the pattern surface 61 on the back surface of the light guide plate 43, therefore, it is allowed to increase or decrease the quantity of light going out from the above region and, for example, to so adjust that the light goes out in a uniform quantity to the back surface side of the planar light-emitting region 45 as a whole.

Figure 27:
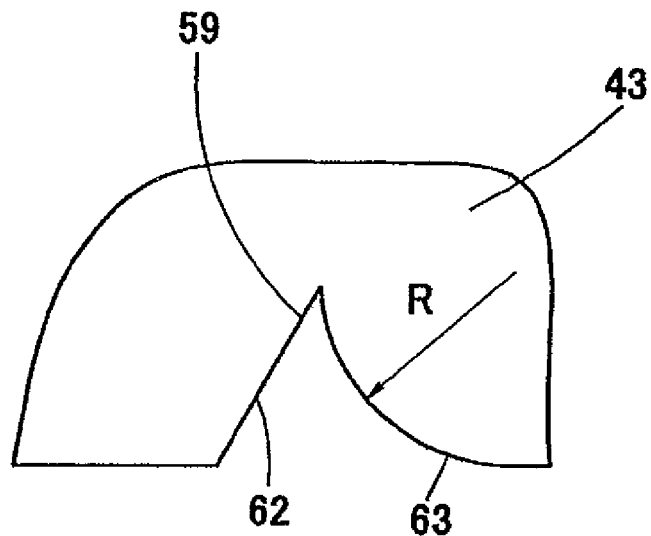
FIG. 27A is a sectional view illustrating a deflecting pattern when the re-falling surface is a curved surface.
FIG. 27B is a sectional view illustrating a deflecting pattern when the re-falling surface is formed by a flat surface and a curved surface.
Figure 27:
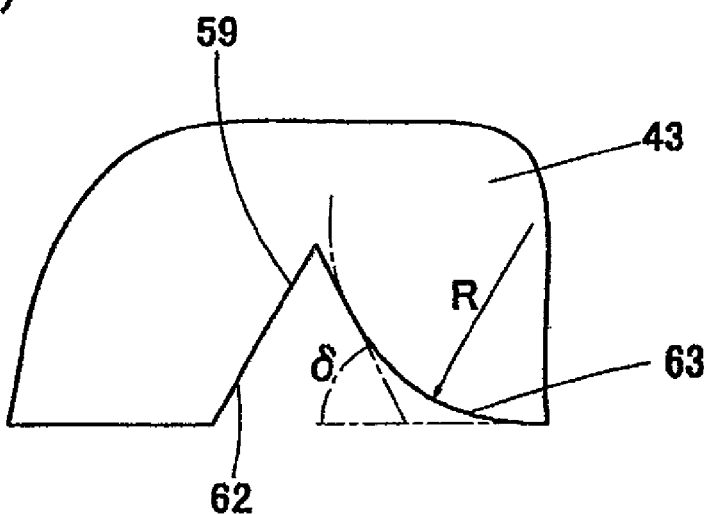

To adjust the amount of light going out from the deflecting patterns 59, further, the re-falling surface 63 may be curved as shown in FIG. 27A in addition to adjusting the angle δ of the re-falling surface 63. It is further allowable to adjust the quantity of light going out from the deflecting patterns 59 by varying the curvature or the radius R of curvature thereof. As shown in FIG. 27B, further, the re-falling surface 63 may be formed by a flat surface and a curved surface. In this case, the quantity of emitted light can be varied depending upon the angle δ of inclination of the flat portion and upon the radius R of curvature of the curved portion, offering increased design parameters and making it possible to execute fine designing.

Figure 26:
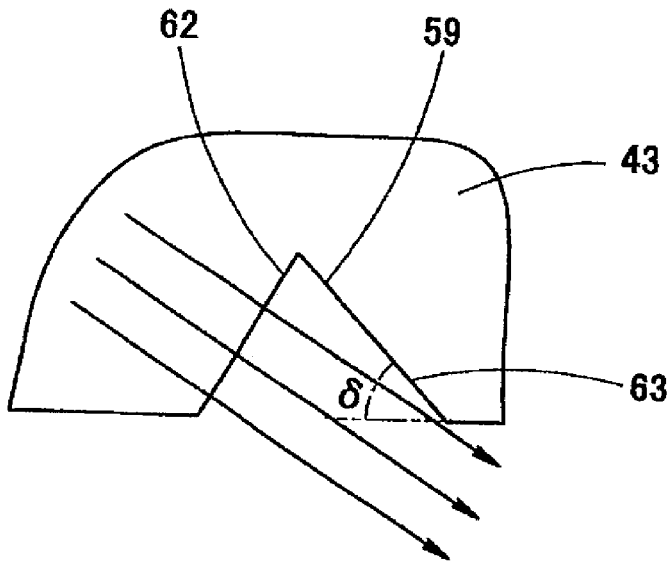
FIG. 26A is a view illustrating the behavior of light falling on the deflecting pattern when the re-falling surface of the light guide plate has a wide angle of inclination.
FIG. 26B is a view illustrating the behavior of light falling on the deflecting pattern when the re-falling surface of the light guide plate has a narrow angle of inclination.
Figure 26:
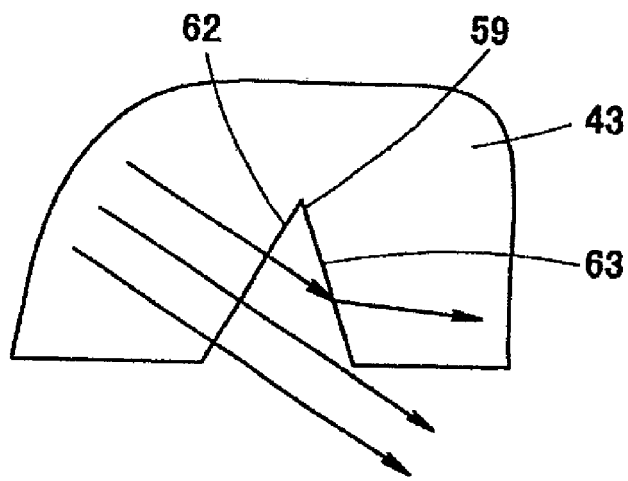
Figure 28:
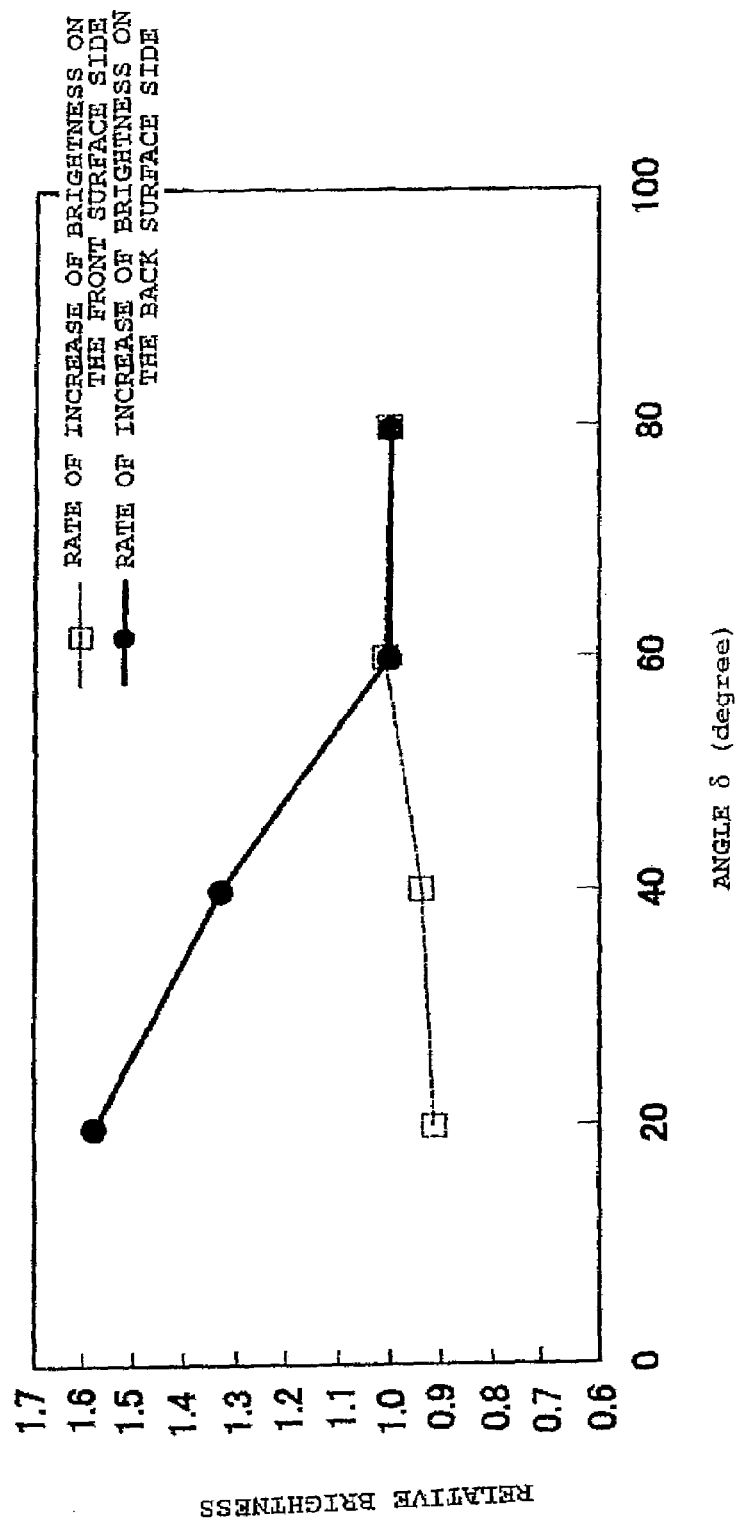
FIG. 28 is a diagram illustrating changes in a rate of increase in the brightness on the front surface side and in a rate of increase in the brightness on the back surface side when the angle of inclination of the re-falling surface is varied.

FIG. 28 shows the measured results of a rate of increase in the brightness on the side of the front surface (light-emitting surface 60) and of a rate of increase in the brightness on the side of the back surface (pattern surface 61) when the angle δ of inclination of the re-falling surface 63 is varied in the deflecting patterns 59 of triangular shapes in cross section as shown in FIGS. 26A and 26B, wherein the ordinate represents the relative brightness of the light going out and the abscissa represents the angle δ of inclination of the re-falling surface 63. Here, the brightness (rate of increase) is based on a value when the angle δ of inclination of the re-falling surface 63 is 80°. Referring to FIG. 28, there is almost no change in the rate of increase in the brightness on the front surface side depending upon the angle δ of inclination of the re-falling surface 63. In the region where the angle δ of inclination is smaller than 60°, however, the relative brightness on the back surface side increases with a decrease in the angle δ of inclination, which is in agreement with the results of FIG. 26.

Figure 29:
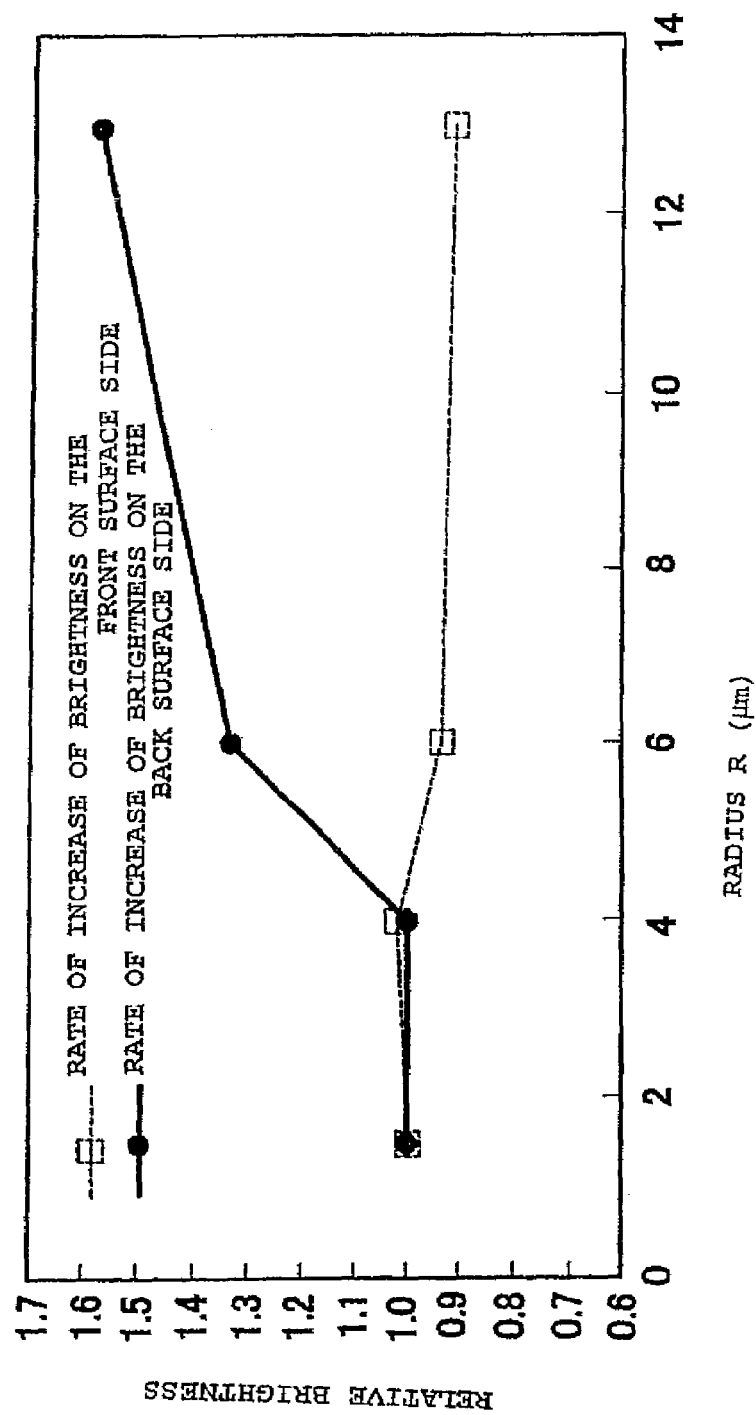
FIG. 29 is a diagram illustrating changes in a rate of increase in the brightness on the front surface side and in a rate of increase in the brightness on the back surface side when the radius of curvature of the re-falling surface is varied.

FIG. 29 shows the measured results of a rate of increase in the brightness on the side of the front surface (light-leaving surface 60) and of a rate of increase in the brightness on the side of the back surface (pattern surface 61) when the radius R of curvature of the re-falling surface 63 is varied in the deflecting patterns 59 as shown in FIG. 27A, wherein the ordinate represents the relative brightness of the light going out and the abscissa represents the radius R of curvature of the re-falling surface 63. Here, the brightness (rate of increase) is based on a value when the radius R of curvature of the re-falling surface 63 is 1.5 μm. Referring to FIG. 29, there is almost no change in the rate of increase in the brightness on the front surface side depending upon the radius R of curvature of the re-falling surface 63. In the region where the radius R of curvature is not smaller than 4 μm, however, the relative brightness on the back surface side increases with an increase in the radius R of curvature.

The above embodiment has explained the plane source of light of the type of emitting light from both surfaces using a so-called point source of light that is a light-emitting diode. The invention, however, can further be applied to the plane source of light using a rod-like source of light such as a cold cathode tube. In this case, however, it becomes necessary to suitably change the design, such as using the prism sheet of a linear and parallel pattern to meet the shape of the source of light.

Second Embodiment

Figure 30:
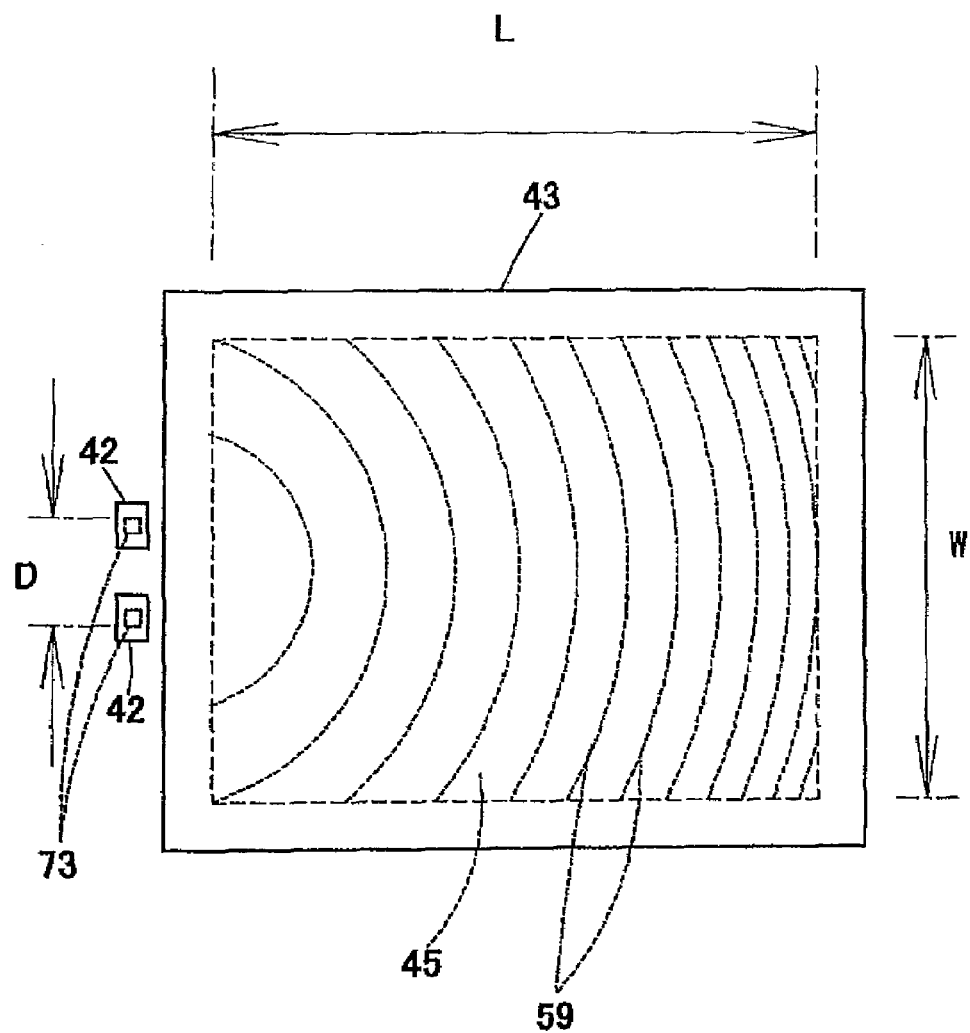
FIG. 30 is a plan view of the plane source of light according to a second embodiment of the invention.
Figure 31:
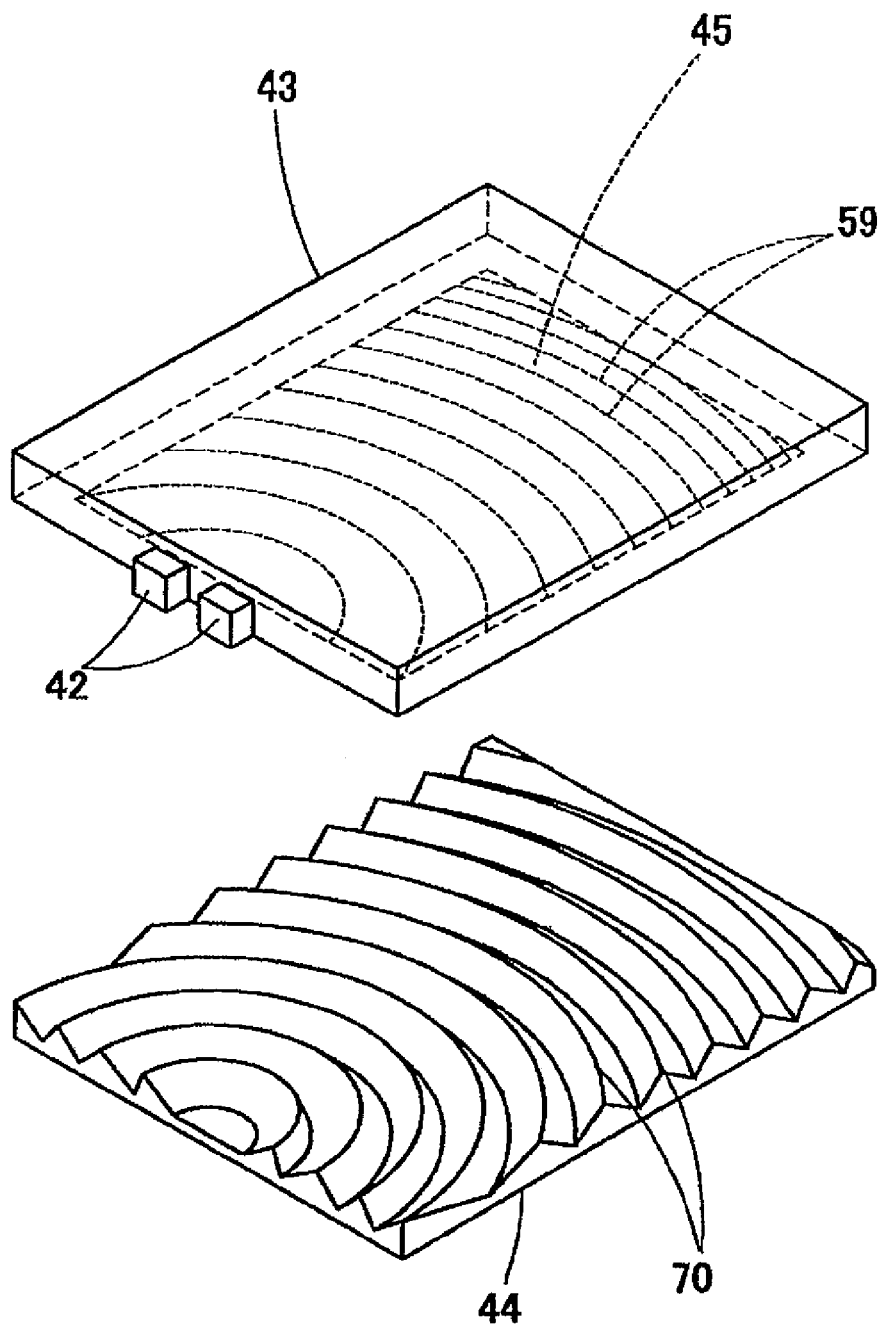
FIG. 31 is a disassembled perspective view of the plane source of light.

FIG. 30 is a plan view illustrating a plane source of light 72 according to a second embodiment of the invention, and FIG. 31 is a disassembled perspective view thereof. In the plane source of light 72 according to this embodiment, a plurality of point sources of light 42 are arranged facing the central portion of the short side of the light guide plate 43. On the planar light-emitting region 45 on the back surface of the light guide plate 43, there are formed many deflecting patterns 59 in an arcuate shape with the light-emitting region of the point sources of light 42 nearly as a center. The deflecting patterns 59 are formed in nearly a right-angled triangular shape in cross section as described in the first embodiment. Prism surfaces may be formed on the side surfaces of the light guide plate 43 at positions facing the point sources of light 42 so as to increase the spread of light entering into the light guide plate 43 from the point sources of light 42. In this embodiment, too, the prism sheet 44 arranged on the lower surface side of the point sources of light 42 is provided with arcuate deflecting patterns 59 of a triangular shape in cross section in a concentric manner with a portion corresponding to the light-emitting region of the point sources of light 42 nearly as a center like the deflecting patterns 59.

In this invention, the point sources of light stand for those of which the whole size of the light-emitting bodies contained therein is not larger than 9 mm. When, for example, there is contained only one light-emitting body therein (bare chip of light-emitting diode, etc.), it could be the point source of light referred to in the present invention if the size of the light-emitting body is not larger than 9 mm. Referring to FIG. 30, further, when there are provided a plurality of point sources of light 42 and a light-emitting body 73 such as a bare chip of light-emitting diode is sealed in each point source of light 42, the width D of the light-emitting bodies 73 as a whole shown in FIG. 30 may not be greater than 9 mm. In the embodiment shown in FIG. 30, for instance, the planar light-emitting region 45 on the back surface of the light guide plate 43 has a length L of 40 mm and a width W of 30 mm. Two point sources of light 42 each having a width (inclusive of the armoring resin) of 3 mm are arranged maintaining a gap of 3 mm; i.e., the point sources of light 42 as a whole have a width of 9 mm.

Liquid Crystal Display Device

Figure 32:
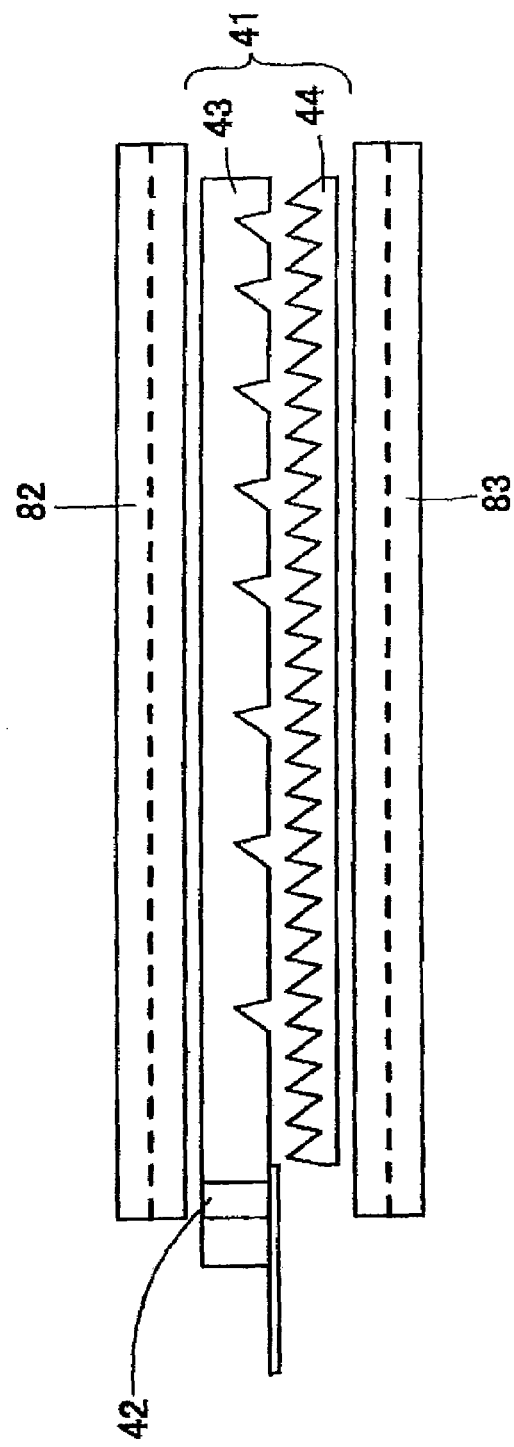
FIG. 32 is a view schematically illustrating the structure of a liquid crystal display device of the invention.

FIG. 32 is a side view schematically illustrating a liquid crystal display device 81 using the plane source of light 41 of the type of emitting light from both surfaces having the structure as described above. The liquid crystal display device 81 includes a liquid crystal display panel 82 of the transmission type facing the surface (light-leaving surface 60) of the plane source of light 41 of the invention, and a liquid crystal display panel 83 of the transmission type facing the prism sheet 44.

According to the above liquid crystal display device 81, the liquid crystal display panel 82 and the liquid crystal display panel 83 on both the front and back surfaces can be illuminated by one plane source of light 41 (back light) from the back surface sides to display images. Besides, different images can be displayed on the front and back liquid crystal display panels 82 and 83.

In this liquid crystal display device 81, only one plane source of light 41 may be used, making it possible to decrease the thickness of the liquid crystal display device 81. Besides, use of the plane source of light 41 of the invention helps improve the light utilization efficiency, suppressing the depletion of battery.

According to the liquid crystal display device 81 of the invention as described above, further, the external light falling on the liquid crystal display panels 82 and 83 on the front surface side and on the back surface side does not transmit through the liquid crystal display device 81, and the brightness on the screens is not shaded by the external light that has transmitted through the liquid crystal display device 81.

Cell Phone

Figure 33:
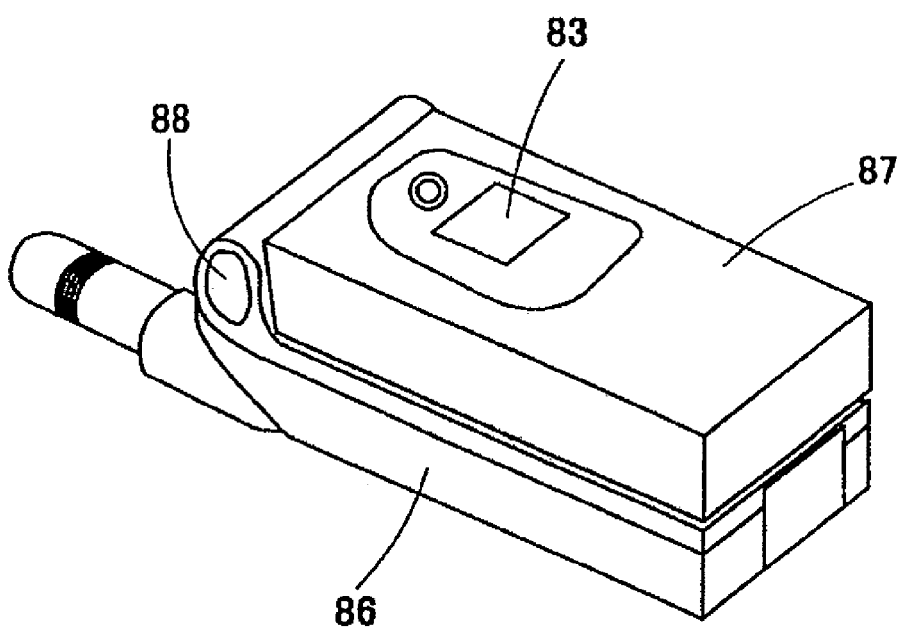
FIG. 33 is a perspective view illustrating a cell phone in a closed state.
Figure 34:
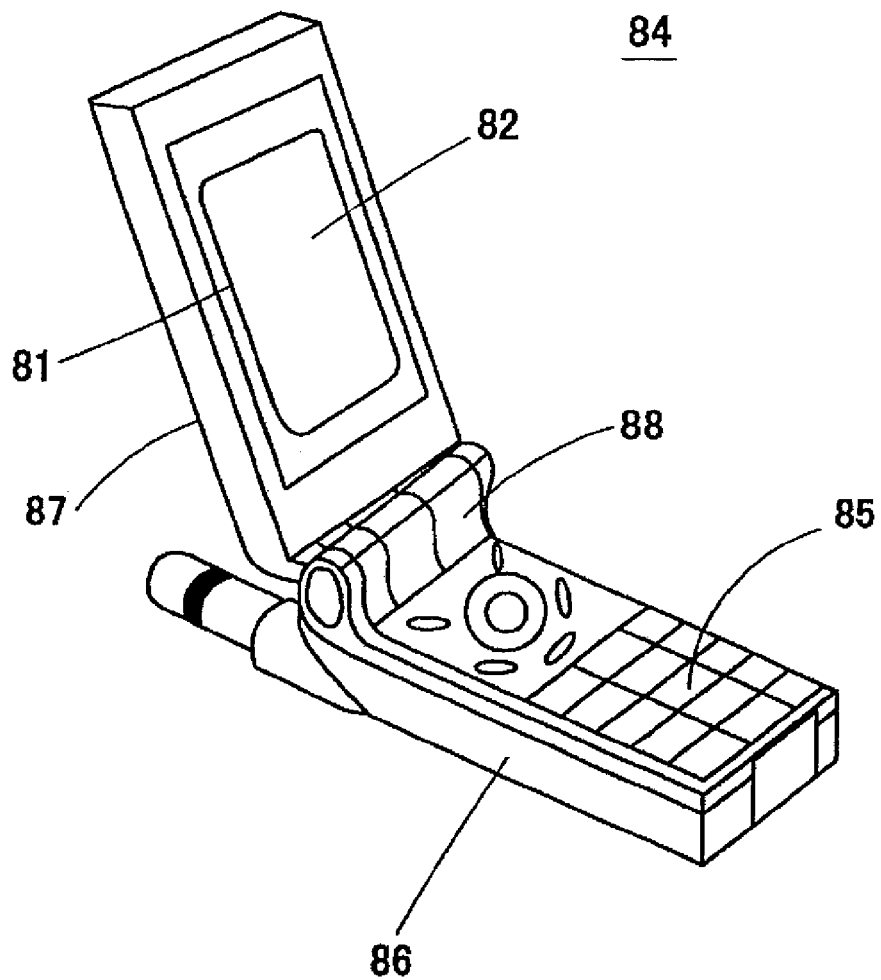
FIG. 34 is a perspective view illustrating the cell phone in an opened state.

FIGS. 33 and 34 are perspective views illustrating a cell phone 84 of the foldable type, wherein FIG. 33 is a perspective view of a state where the cell phone is folded and closed, and FIG. 34 is a perspective view of a state where it is opened. The cell phone 84 comprises a main body 86 incorporating a circuit board and a battery and having switches and ten keys 85 provided on the surface thereof, and a display unit 87 provided with a liquid crystal display, which are coupled together by a hinge 88 so as to be turned. The display unit 87 incorporates the liquid crystal display unit 81 shown in FIG. 32 as a liquid crystal display. The liquid crystal display device 81 used here has the liquid crystal display panel 83 on the back surface side, which is smaller than the liquid crystal display panel 82 on the front surface side. The liquid crystal display panel 82 on the front surface side is exposed to the inner surface of the display unit 87 and the liquid crystal display panel 83 on the back surface side is exposed to the outer surface of the display unit 87.

According to the above cell phone 84, the plane source of light 41 features a high light utilization efficiency, and the liquid crystal display device 81 consumes the electric power in decreased amounts. Therefore, the cell phone 84 features extended periods of battery holding time, decreasing the frequency for electrically charging the battery.

Besides, even when the external light such as sunlight falls on the liquid crystal display panel 83 on the outer side while the liquid crystal display panel 82 of the inner side is being observed by opening the cell phone 84, the external light that is falling goes out aslant due to the prism sheet 44 of the plane source of light 41 and little goes out from the liquid crystal display panel 82 of the inner side. Therefore, the image of the liquid crystal display panel on the back surface side is not reflected on the liquid crystal screen that is being observed, and the brightness is not shaded on the screens. Therefore, the image can be observed more favorably.

According to the plane source of light of the invention, light going out from the back surface side of the light guide plate aslant and is lost can now be bent by the prism sheet in a direction perpendicular thereto to be utilized as illumination light. Thus, light can be emitted from the back surface side, too, with scarcely dropping the front brightness on the front surface side.

In the plane source of light, further, even when the external light such as sunlight or indoor illumination light falls on the back surface side perpendicularly thereto, the external light is bent for its passage by the prism sheet and goes out little from the front surface side transmitting straight through the plane source of light. Conversely, even when the external light such as sunlight or indoor illumination light falls on the front surface side perpendicularly thereto, the external light is bent for its passage by the prism sheet after having transmitted through the light guide plate and goes out little from the back surface side transmitting straight through the plane source of light.

Figure 1:
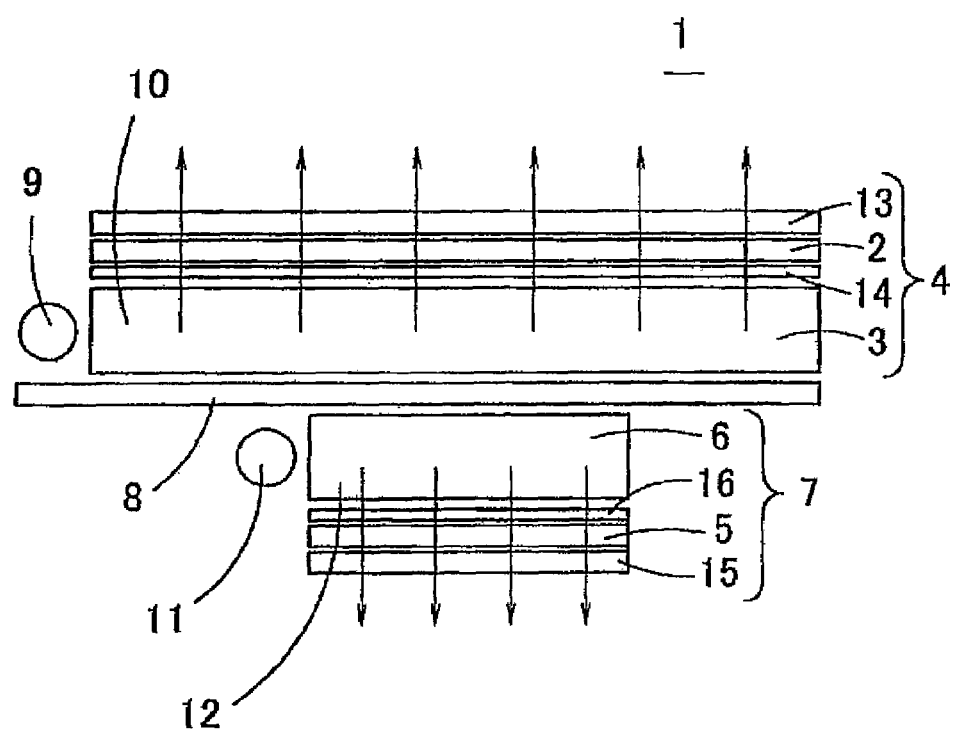
FIG. 1 is a side view schematically illustrating a conventional liquid crystal display device of the type of double-sided display.
Figure 2:
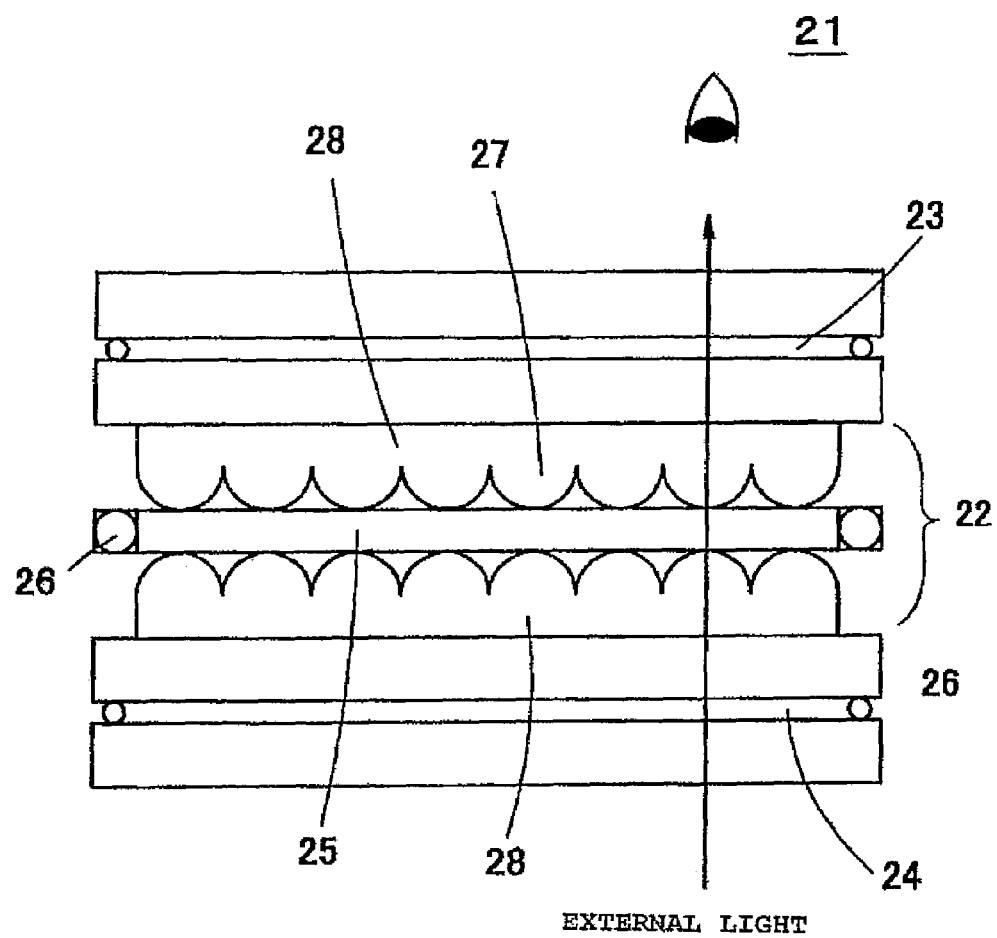
FIG. 2 is a side view schematically illustrating another conventional liquid crystal display device of the type of double-sided display.
Figure 3:
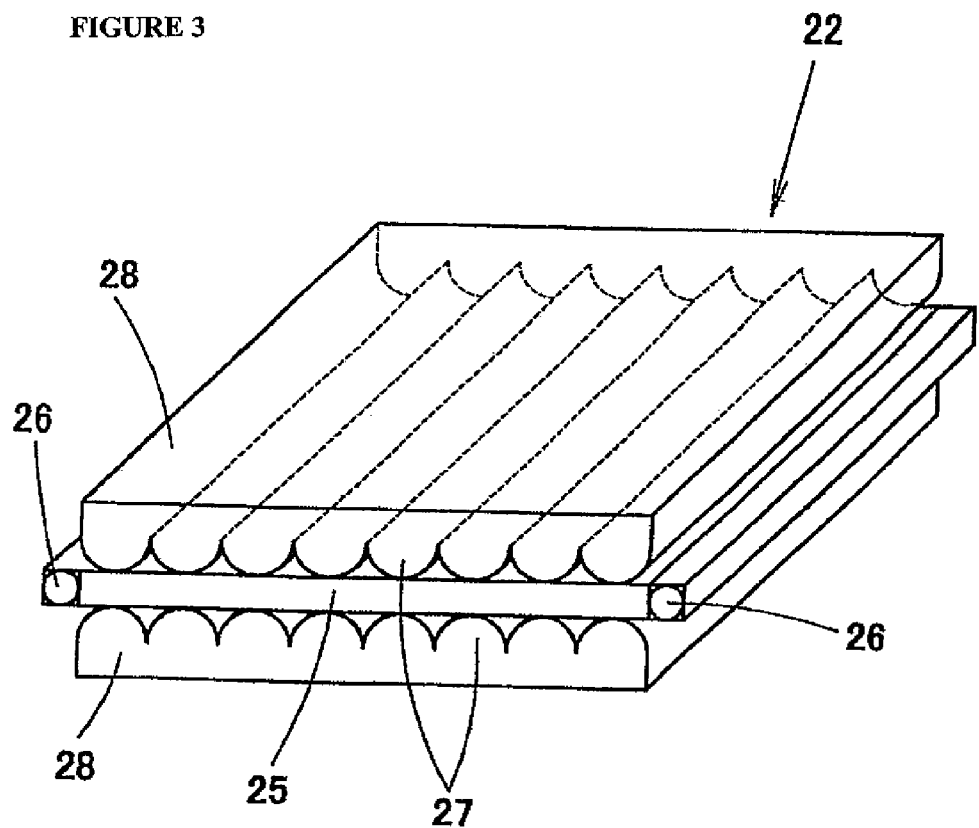
FIG. 3 is a perspective view of a plane source of light of the type of emitting light from both surfaces used in the above liquid crystal display devices.
Figure 4:
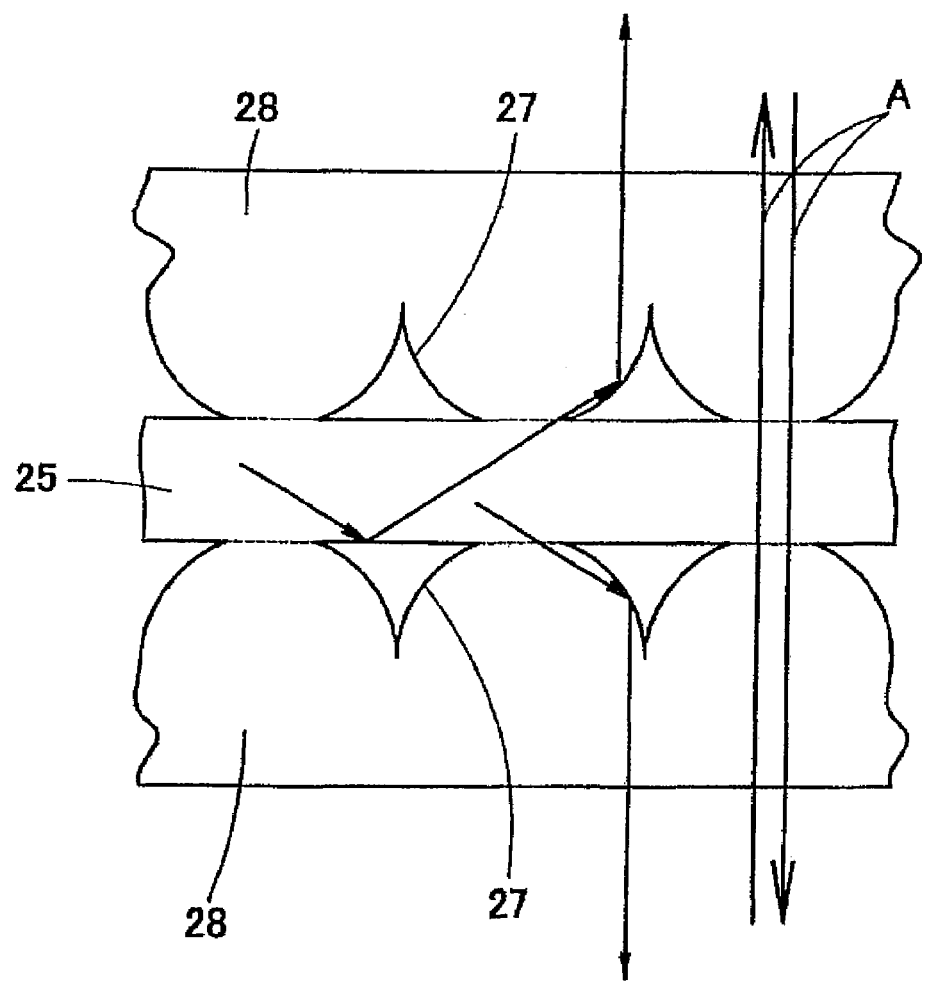
FIG. 4 is a view of a portion of the plane source of light on an enlarged scale for explaining the action thereof.
Figure 19:
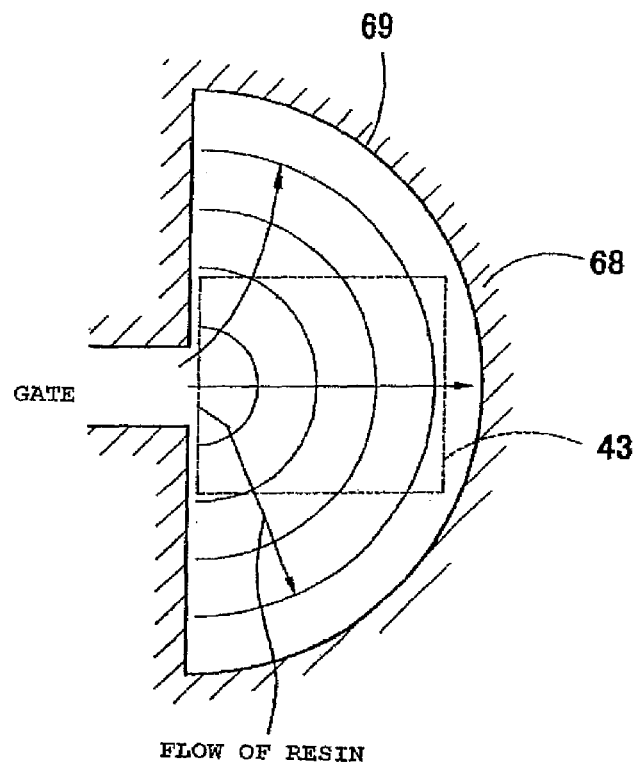
FIG. 19 is a view illustrating the formation of a light guide plate by using a metal mold having a cavity larger than the desired light guide plate and permitting the resin to smoothly flow.
Figure 22:
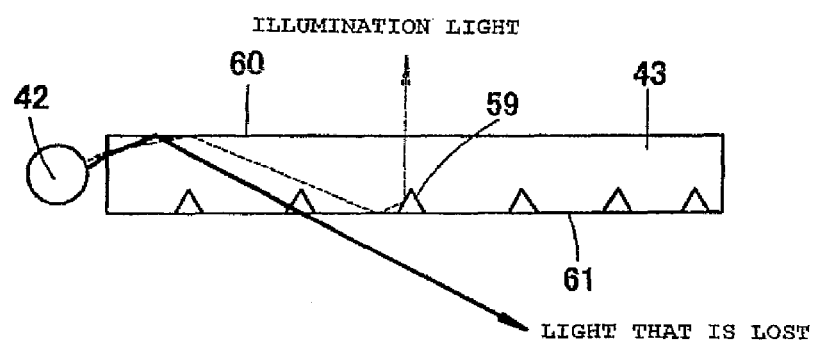
FIGS. 22A and 22B are views illustrating comparative examples.
Figure 22:
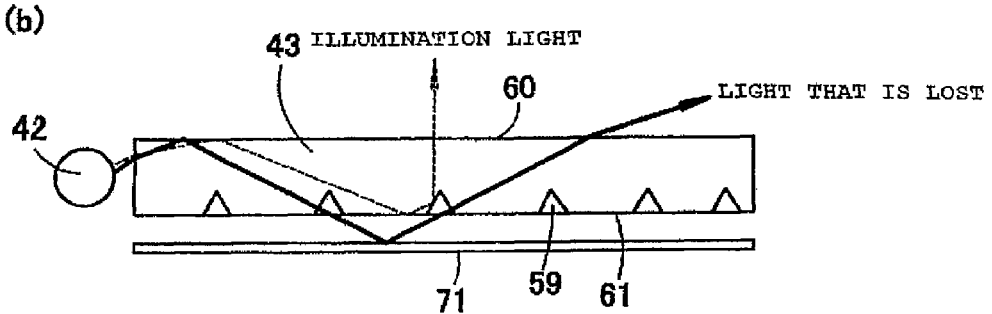
Figure 23:
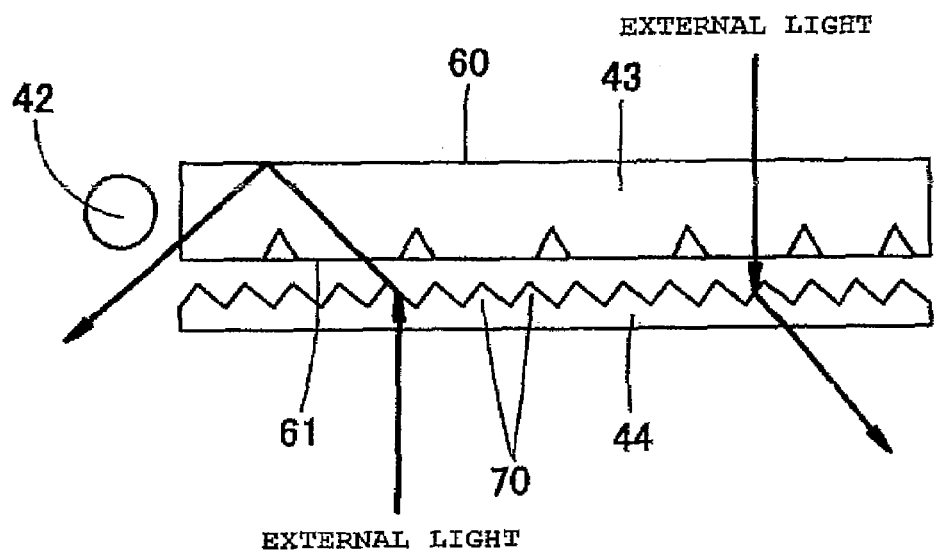
FIG. 23 is a view illustrating the action of the plane source of light of the invention.

FIG. 2:
1—EXTERNAL LIGHT
FIG. 10:
1—RAY OF LIGHT
FIG. 13:
1—DENSITY OF PATTERNS
2—DISTANCE r FROM THE SOURCE OF LIGHT
FIG. 14:
1—LENGTH OF PATTERNS
2—DISTANCE r FROM THE SOURCE OF LIGHT
FIG. 15:
1—NUMBER OF PATTERNS/AREA
2—DISTANCE r FROM THE SOURCE OF LIGHT
FIG. 18:
1—GATE
2—FLOW OF RESIN
FIG. 19:
1—GATE
2—FLOW OF RESIN
FIG. 20:
1—SIDE OF THE SOURCE OF LIGHT
FIG. 22:
1—ILLUMINATION LIGHT
2—LIGHT THAT IS LOST
FIG. 23:
1—EXTERNAL LIGHT
FIG. 24:
1—COMPARATIVE EXAMPLE
2—INTENSITY (a.u.)
3—ANGLE (degrees)
4—ILLUMINATION LIGHT AND LIGHT THAT IS LOST
5—ILLUMINATION LIGHT
6—LIGHT THAT IS LOST
FIG. 25:
1—THIS INVENTION
2—INTENSITY (a.u.)
3—ANGLE (degree)
4—GOING OUT FROM THE FRONT SURFACE AND THE BACK SURFACE
5—GOING OUT FROM THE FRONT SURFACE
6—GOING OUT FROM THE BACK SURFACE
FIG. 28:
1—RELATIVE BRIGHTNESS
2—ANGLE δ (degree)
3—RATE OF INCREASE OF BRIGHTNESS ON THE FRONT SURFACE SIDE
4—RATE OF INCREASE OF BRIGHTNESS ON THE BACK SURFACE SIDE
FIG. 29:
1—RELATIVE BRIGHTNESS
2—RADIUS R (μm)
3—RATE OF INCREASE OF BRIGHTNESS ON THE FRONT SURFACE SIDE
4—RATE OF INCREASE OF BRIGHTNESS ON THE BACK SURFACE SIDE

What is claimed is:

1. A plane source of light comprising:
a source of light;
a light guide plate which confines light from the source of light, spreads light like a plane, and permits light to go out from the light-leaving surface and from at least a portion of the surface on the side opposite to the light-leaving surface; and
a prism sheet arranged facing the side opposite to the light-leaving surface, wherein deflecting patterns are formed on the surface of the light guide plate on the side opposite to the light-leaving surface for reflecting light that propagates through the light guide plate;

light reflected by the deflecting patterns goes out from the light-leaving surface in a manner that the direction of a peak intensity thereof is nearly perpendicular to the light-leaving surface;

light goes out from the surface on the side opposite to the light-leaving surface in a manner that the direction of a peak intensity thereof is aslant relative to a direction perpendicular to the surface of the opposite side;

light going out from the surface on the opposite side is deflected by the prism sheet in a manner that the direction of a peak intensity thereof is nearly perpendicular to the surface on the opposite side; and the source of light is a point source of light, and arcuate patterns are formed on the prism sheet with a position corresponding to the point source of light as nearly a center.

2. A plane source of light comprising:

a source of light;

a light guide plate which confines light from the source of light, spreads light like a plane, and permits light to go out from the light-leaving surface and from at least a portion of the surface on the side opposite to the light-leaving surface; and a prism sheet arranged facing the side opposite to the light-leaving surface, wherein deflecting patterns are formed on the surface of the light guide plate on the side opposite to the light-leaving surface for reflecting light that propagates through the light guide plate;

light reflected by the deflecting patterns goes out from the light-leaving surface in a manner that the direction of a peak intensity thereof is nearly perpendicular to the light-leaving surface;

light goes out from the surface on the side opposite to the light-leaving surface in a manner that the direction of a peak intensity thereof is aslant relative to a direction perpendicular to the surface of the opposite side;

light going out from the surface on the opposite side is deflected by the prism sheet in a manner that the direction of a peak intensity thereof is nearly perpendicular to the surface on the opposite side; and patterns of nearly a triangular shape in cross section are formed on the prism sheet, the patterns having, in cross section, a one-side vertical angle on the side of the source of light smaller than the one-side vertical angle on the opposite side.

3. A plane source of light comprising:

a source of light;

a light guide plate which confines light from the source of light, spreads light like a plane, and permits light to go out from the light-leaving surface and from at least a portion of the surface on the side opposite to the light-leaving surface; and a prism sheet arranged facing the side opposite to the light-leaving surface, wherein deflecting patterns are formed on the surface of the light guide plate on the side opposite to the light-leaving surface for reflecting light that propagates through the light guide plate;

light reflected by the deflecting patterns goes out from the light-leaving surface in a manner that the direction of a peak intensity thereof is nearly perpendicular to the light-leaving surface;

light goes out from the surface on the side opposite to the light-leaving surface in a manner that the direction of a peak intensity thereof is aslant relative to a direction perpendicular to the surface of the opposite side;

light going out from the surface on the opposite side is deflected by the prism sheet in a manner that the direction of a peak intensity thereof is nearly perpendicular to the surface on the opposite side; and the deflecting patterns are of nearly a triangular shape in cross section, and an angle of inclination of slopes of the deflecting patterns on the light-emitting surface of the light guide plate and on at least a partial region on the surface on the opposite side on the side remote from the source of light, is different from an angle of inclination of slopes of the deflecting patterns in other regions on the side remote from the source of light.

4. A plane source of light comprising:

a source of light;

a light guide plate which confines light from the source of light, spreads light like a plane, and permits light to go out from the light-leaving surface and from at least a portion of the surface on the side opposite to the light-leaving surfaces and a prism sheet arranged facing the side opposite to the light-leaving surface, wherein deflecting patterns are formed on the surface of the light guide plate on the side opposite to the light-leaving surface for reflecting light that propagates through the light guide plate;

light reflected by the deflecting patterns goes out from the light-leaving surface in a manner that the direction of a peak intensity thereof is nearly perpendicular to the light-leaving surface;

light goes out from the surface on the side opposite to the light-leaving surface in a manner that the direction of a peak intensity thereof is aslant relative to a direction perpendicular to the surface of the opposite side;

light going out from the surface on the opposite side is deflected by the prism sheet in a manner that the direction of a peak intensity thereof is nearly perpendicular to the surface on the opposite side; and wherein the deflecting patterns are of nearly a triangular shape in cross section, the slopes thereof assuming at least a partly curved surface on the side remote from the source of light, and a curvature of slopes of the deflecting patterns on the light-emitting surface of the light guide plate and on at least a partial region on the surface on the opposite side on the side remote from the source of light, is different from a curvature of slopes of the deflecting patterns in other regions on the side remote from the source of light.

5. An image display device comprising image display panels arranged facing the light-leaving surface of the plane source of light of claim 1 and facing the surface on the side opposite to the light-leaving surface.

6. An image display device comprising image display panels arranged facing the light-leaving surface of the plane source of light of claim 2 and facing the surface on the side opposite to the light-leaving surface.

7. An image display device comprising image display panels arranged facing the light-leaving surface of the plane source of light of claim 3 and facing the surface on the side opposite to the light-leaving surface.

8. An image display device comprising image display panels arranged facing the light-leaving surface of the plane source of light of claim 4 and facing the surface on the side opposite to the light-leaving surface.

* * * * *